(12) United States Patent
Jiang et al.

(10) Patent No.: US 11,419,069 B2
(45) Date of Patent: Aug. 16, 2022

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMIIED, Shanghai (CN)

(*) Notice: Subject to any disclaimer, the term of this patent is extended or adjusted under 35 U.S.C. 154(b) by 52 days.

(21) Appl. No.: 17/017,718

(22) Filed: Sep. 11, 2020

(65) Prior Publication Data
US 2020/0413353 A1 Dec. 31, 2020

Related U.S. Application Data

(63) Continuation of application No. PCT/CN2020/088394, filed on Apr. 30, 2020.

(30) Foreign Application Priority Data

May 14, 2019 (CN) .......................... 201910399542.3

(51) Int. Cl.
*H04W 72/00* (2009.01)
*H04W 52/50* (2009.01)
(Continued)

(52) U.S. Cl.
CPC ........... *H04W 52/50* (2013.01); *H04W 72/02* (2013.01); *H04W 72/042* (2013.01);
(Continued)

(58) Field of Classification Search
CPC . H04W 72/04; H04W 72/0473; H04W 72/02; H04W 72/0413
See application file for complete search history.

(56) References Cited

U.S. PATENT DOCUMENTS

2016/0249352 A1  8/2016  Kim et al.
2018/0014262 A1* 1/2018  Lee ........................ H04W 52/30
(Continued)

FOREIGN PATENT DOCUMENTS

CN   105307234 A   2/2016
CN   107645748 A   1/2018
(Continued)

OTHER PUBLICATIONS

CN201910399542.3 1st Office Action dated Apr. 20, 2021.
(Continued)

*Primary Examiner* — Abdelillah Elmejjarmi

(57) ABSTRACT

The present disclosure discloses a method and a device in nodes used for wireless communications. A first node first receives a first radio signal and a second radio signal; and then determines that transmitting power of first control information in a first time window is a first power value and transmitting power of second control information in a second time window is a second power value; and transmits the first control information in the first time window with the first power value; the first power value is unrelated to the second power value, and the second power value is relevant to whether the first time window overlaps with the second time window. The present disclosure designs power allocation priorities of first control information and second control information to optimize both transmission performance and efficiency of a feedback channel in sidelink.

12 Claims, 17 Drawing Sheets

(51) Int. Cl.
*H04W 72/02* (2009.01)
*H04W 72/04* (2009.01)
(52) U.S. Cl.
CPC ... *H04W 72/0446* (2013.01); *H04W 72/0473* (2013.01); *H04W 72/0493* (2013.01)

(56) References Cited

U.S. PATENT DOCUMENTS

| | | |
|---|---|---|
| 2018/0317221 A1 | 11/2018 | Yasukawa et al. |
| 2019/0052436 A1 | 2/2019 | Desai et al. |
| 2019/0104477 A1 | 4/2019 | MolavianJazi et al. |
| 2019/0159137 A1* | 5/2019 | Zhang ................ H04W 52/146 |

FOREIGN PATENT DOCUMENTS

| | | | |
|---|---|---|---|
| CN | 107666701 A * | 2/2018 | ............ H04W 52/14 |
| CN | 107733620 A | 2/2018 | |
| CN | 109245869 A | 1/2019 | |
| CN | 109661833 A | 4/2019 | |
| EP | 3131349 A1 | 2/2017 | |
| KR | 3893563 A1 * | 10/2021 | ............ H04W 52/34 |

OTHER PUBLICATIONS

CN201910399542.3 First Search Report dated Apr. 9, 2021.
ISR in application PCT/CN2020/088394 dated Aug. 12, 2020.
Huawei, HiSilicon Suppor frsidelink unicast groupcast and broadcast 3GPP TSG RAN WGI Meeting#94bis, R1-1810137 (Dec. 10, 2018) section 2.1 2.3 3.

* cited by examiner

METHOD AND DEVICE IN NODES USED FOR WIRELESS COMMUNICATION

CROSS REFERENCE TO RELATED APPLICATIONS

This application is a continuation of International Application No. PCT/CN2020/088394, filed Apr. 30, 2020, claims the priority benefit of Chinese Patent Application No. 201910399542.3, filed on May 14, 2019, the full disclosure of which is incorporated herein by reference.

BACKGROUND

Technical Field

The present disclosure relates to transmission methods and devices in wireless communication systems, and in particular to a method and device of power control in IoT or V2X system.

Related Art

In response to rapidly growing Vehicle-to-Everything (V2X) business, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was initiated. Later at the first AdHoc conference of RAN1 2019, it was agreed that the pathloss between a transmitter and a receiver in a V2X pair will be taken as reference when calculating the V2X transmitting power.

In the discussions in Rel-12/13/14 over Device to Device (D2D) and V2X, the transmitting power on a sidelink is generally obtained based on a pathloss between a base station and a terminal, so as to ensure that radio signals transmitted on a sidelink won't impact uplink receiving of the base station. In Rel-15, when it comes to NR-based V2X, interferences of radio signals between V2X links also need to be considered. Further, at the RAN1 #96bis meeting, RAN1 agreed that there is need to support transmission of Physical Sidelink Feedback Channel (PSFCH) in sidelink groupcast and unicast to improve sidelink transmission performance, therefore, a corresponding method of power control has to be re-optimized.

SUMMARY

According to the latest progress in discussions about V2X at the RAN1 #96bis meeting, a pathloss on the sidelink needs to be considered in the power control on the sidelink. Besides, a groupcast PSFCH can support two modes of merely feeding back Non-Acknowledgement and feeding back Hybrid Automatic Repeat request Acknowledgement (HARQ-ACK); while a unicast one only supports feeding back HARQ-ACK. In view of the above modes of feedback, when a terminal device is in groupcast-based V2X communications and unicast-based V2X communications at the same time, how to determine groupcast and the unicast transmitting power values, especially the power value of a feedback channel, will be a big problem.

A simple solution is that separate power control mechanisms are respectively employed in groupcast and unicast to match respective pathlosses on different radio links. However, when the power value on the V2X link is limited, or an expected power value calculated based on pathloss is greater than a power value the terminal can afford, there will be some deficiency in implementation. To address the issue, the present disclosure provides a solution. It should be noted that the embodiments in a first node, a second node and a third node of the present disclosure and the characteristics in the embodiments may be applied to a base station, and the embodiments in a fourth node of the present disclosure and characteristics in the embodiments may be applied to a terminal. In the present disclosure, the embodiments and the characteristics in the embodiments can be mutually combined if no conflict is incurred.

The present disclosure provides a method in a first node used for wireless communications, comprising:
receiving a first radio signal and a second radio signal;
determining a transmitting power of first control information in a first time window as a first power value and a transmitting power of second control information in a second time window as a second power value; and
transmitting first control information with the first power value in the first time window;
herein, the first control information is associated with the first radio signal, and the second control information is associated with the second radio signal; the first radio signal is unicast, while the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

In one embodiment, an advantage of the above method is that when a transmission of the first control information and a transmission of the second control information are overlapped in time domain, a transmitting power value of the first control information shall be guaranteed in the first place, so that between feedback to groupcast and feedback to unicast, a transmitting power value of the feedback to unicast will be first guaranteed, thus ensuring the performance of unicast transmission in V2X as prioritized.

In one embodiment, the principle of the above method lies in that in groupcast transmission, as long as a user in a terminal group feeds back NACK, a groupcast transmission will have to be retransmitted, and a HARQ-ACK feeding back from a single user in groupcast transmission only partially influence whether a retransmission shall be performed; but as for unicast, whether a unicast transmission needs to be retransmitted depends totally on the feedback to the unicast; therefore, the priority of power allocation of the feedback to the unicast shall prevail over that of the feedback to the groupcast.

According to one aspect of the present disclosure, the above method is characterized in comprising:
transmitting the second control information with the second power value in the second time window;
herein, when the first time window overlaps with the second time window, a difference between a first remaining power value and the first power value is used to determine the second power value; when the first time window does not overlap with the second time window, the second power value is unrelated to the first power value.

In one embodiment, an advantage of the above method is that when the first control information and the second control information are overlapped in time domain, the power will be first allocated to the first control information; when the first control information and the second control information are non-overlapped in time domain, the second power value and the first power value are determined independently.

According to one aspect of the present disclosure, the above method is characterized in comprising:

dropping a transmission of second control information in the second time window when the first time window overlaps with the second time window, the second power value being 0; or transmitting second control information with the second power value in the second time window when the first time window does not overlap with the second time window, the second power value being unrelated to the first power value.

In one embodiment, an advantage of the above method is that when the first control information overlaps (that is, conflict) with the second control information in time domain and there is power limitation, a first node drops transmitting the second control information, so as to ensure that the first control information is transmitted with a largest power value that the first node can afford, and thus ensuring the performance of the first control information.

According to one aspect of the present disclosure, the above method is characterized in comprising:

transmitting a target radio signal with a target power value in a target time window;

herein, the first radio signal and the second radio signal are transmitted in sidelink, while the target radio signal is transmitted on uplink; the first power value is relevant to whether the first time window overlaps with the target time window, the target power value is unrelated to the first power value.

In one embodiment, an advantage of the above method is to further ensure that the priority of power allocation of a channel on a Uu link is higher than that on a sidelink, thus guaranteeing transmission performance on the Uu link.

According to one aspect of the present disclosure, the above method is characterized in comprising:

receiving a third radio signal; and
receiving a fourth radio signal;

herein, a transmitter of the first radio signal transmits the third radio signal, while a transmitter of the second radio signal transmits the fourth radio signal; the third radio signal is used to determine a first expected power value, and the fourth radio signal is used to determine a second expected power value; the first power value is equal to the first expected power value, the second power value is less than the second expected power value.

According to one aspect of the present disclosure, the above method is characterized in comprising:

receiving a first signaling;
receiving a second signaling;

herein, the first signaling comprises configuration information for the first radio signal, the configuration information comprises time domain resources occupied, frequency domain resources occupied, a Modulation and Coding Status (MCS), and a Redundancy Version (RV); the second signaling comprises configuration information for the second radio signal, the configuration information comprises at least one of time domain resources occupied, frequency domain resources occupied, an MCS or an RV.

The present disclosure provides a method in a second node used for wireless communications, comprising:

transmitting a first radio signal; and
receiving first control information in a first time window;

herein, the first control information is associated with the first radio signal, the first radio signal is unicast; a transmitting power of the first control information in the first time window is a first power value; a transmitter of the first control information determines a transmitting power of second control information in a second time window as a second power value, the second control information is associated with the second radio signal, and the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

According to one aspect of the present disclosure, the above method is characterized in comprising:

transmitting a third radio signal;

herein, the third radio signal is used to determine a first expected power value, the first power value is equal to the first expected power value.

According to one aspect of the present disclosure, the above method is characterized in comprising:

transmitting a first signaling;

herein, the first signaling comprises configuration information for the first radio signal, the configuration information comprises at least one of time domain resources occupied, frequency domain resources occupied, an MCS or an RV.

The present disclosure provides a method in a third node used for wireless communications, comprising:

transmitting a second radio signal; and
receiving second control information in a second time window;

herein, the second control information is associated with the second radio signal, the second radio signal is groupcast; a transmitting power of the second control information in the second time window is a second power value; a transmitter of the second control information determines a transmitting power of first control information in a first time window as a first power value, the first control information is associated with the first radio signal, and the first radio signal is unicast; the first power value is unrelated to the second power value, the second power value is relevant to whether the first time window overlaps with the second time window; a physical layer channel format occupied by the first control information is the same as a physical layer channel format occupied by the second control information.

According to one aspect of the present disclosure, the above method is characterized in comprising:

transmitting a fourth radio signal;

herein, the fourth radio signal is used to determine a second expected power value, the second power value is less than the second expected power value.

According to one aspect of the present disclosure, the above method is characterized in comprising:

transmitting a second signaling;

herein, the second signaling comprises configuration information for the second radio signal, the configuration information comprises at least one of time domain resources occupied, frequency domain resources occupied, an MCS or an RV.

The present disclosure provides a method in a fourth node used for wireless communications, comprising:

receiving a target radio signal in a target time window;

herein, a first radio signal and a second radio signal are transmitted in sidelink, while the target radio signal is transmitted on uplink; first control information is associated with the first radio signal, and second control information is associated with the second radio signal; the first radio signal is unicast, while the second radio signal is groupcast; both a transmitter of the first radio signal and a transmitter of the second radio signal are non-co-located with the fourth node; a transmitting power of the first control information in a first time window is a first power value, and a transmitting power of the second control information in a second time window is a second power value; the first power value is unrelated to the second power value, the second power value is relevant to whether the first time window overlaps with the second time window; a physical layer channel format occupied by the first control information is the same as a physical layer channel format occupied by the second control information; the first power value is relevant to whether the first time window overlaps with the target time window, the target power value is unrelated to the first power value.

The present disclosure provides a first node used for wireless communications, comprising:

a first receiver, receiving a first radio signal and a second radio signal;

a first processor, determining a transmitting power of first control information in a first time window as a first power value and a transmitting power of second control information in a second time window as a second power value; and a first transmitter, transmitting first control information with the first power value in the first time window;

herein, the first control information is associated with the first radio signal, and the second control information is associated with the second radio signal; the first radio signal is unicast, while the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

The present disclosure provides a second node used for wireless communications, comprising:

a second transmitter, transmitting a first radio signal; and a second receiver, receiving first control information in a first time window;

herein, the first control information is associated with the first radio signal, the first radio signal is unicast; a transmitting power of the first control information in the first time window is a first power value; a transmitter of the first control information determines a transmitting power of second control information in a second time window as a second power value, the second control information is associated with the second radio signal, and the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

The present disclosure provides a third node used for wireless communications, comprising:

a third transmitter, transmitting a second radio signal; and a third receiver, receiving second control information in a second time window;

herein, the second control information is associated with the second radio signal, the second radio signal is groupcast; a transmitting power of the second control information in the second time window is a second power value; a transmitter of the second control information determines a transmitting power of first control information in a first time window as a first power value, the first control information is associated with the first radio signal, and the first radio signal is unicast; the first power value is unrelated to the second power value, the second power value is relevant to whether the first time window overlaps with the second time window; a physical layer channel format occupied by the first control information is the same as a physical layer channel format occupied by the second control information.

The present disclosure provides a fourth node used for wireless communications, comprising:

a fourth receiver, receiving a target radio signal in a target time window;

herein, a first radio signal and a second radio signal are transmitted in sidelink, while the target radio signal is transmitted in uplink; first control information is associated with the first radio signal, and second control information is associated with the second radio signal; the first radio signal is unicast, while the second radio signal is groupcast; both a transmitter of the first radio signal and a transmitter of the second radio signal are non-co-located with the fourth node; a transmitting power of the first control information in a first time window is a first power value, and a transmitting power of the second control information in a second time window is a second power value; the first power value is unrelated to the second power value, the second power value is relevant to whether the first time window overlaps with the second time window; a physical layer channel format occupied by the first control information is the same as a physical layer channel format occupied by the second control information; the first power value is relevant to whether the first time window overlaps with the target time window, the target power value is unrelated to the first power value.

In one embodiment, the present disclosure has the following advantages compared with prior art:

When a transmission of the first control information is overlapped with a transmission of the second control information in time domain, a transmitting power value of the first control information shall first be guaranteed, and, when it comes to the feedback to groupcast and the feedback to unicast, a transmitting power value for the feedback to unicast shall be ensured in preference to that for the feedback to groupcast, so as to ensure the performance of unicast transmission in V2X.

When there is power left over after prioritized power allocation to the first control information, the remaining power can be allocated to the second control information to ensure a transmission of the second control information; or a transmission of the second control information is dropped in a second time window, thus conserving UE consumption.

When a transmission of the first control information is non-overlapped with a transmission of the second control information in time domain, the first power value and the second power value are determined independently, thereby guaranteeing the performance of V2X transmission.

The priority of power allocation of a channel on a Uu link is further ensured to be higher than that on a sidelink, namely, higher priority is given to power allocation of the target radio signal compared with the first control information so as to guarantee the transmission performance on the Uu link.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
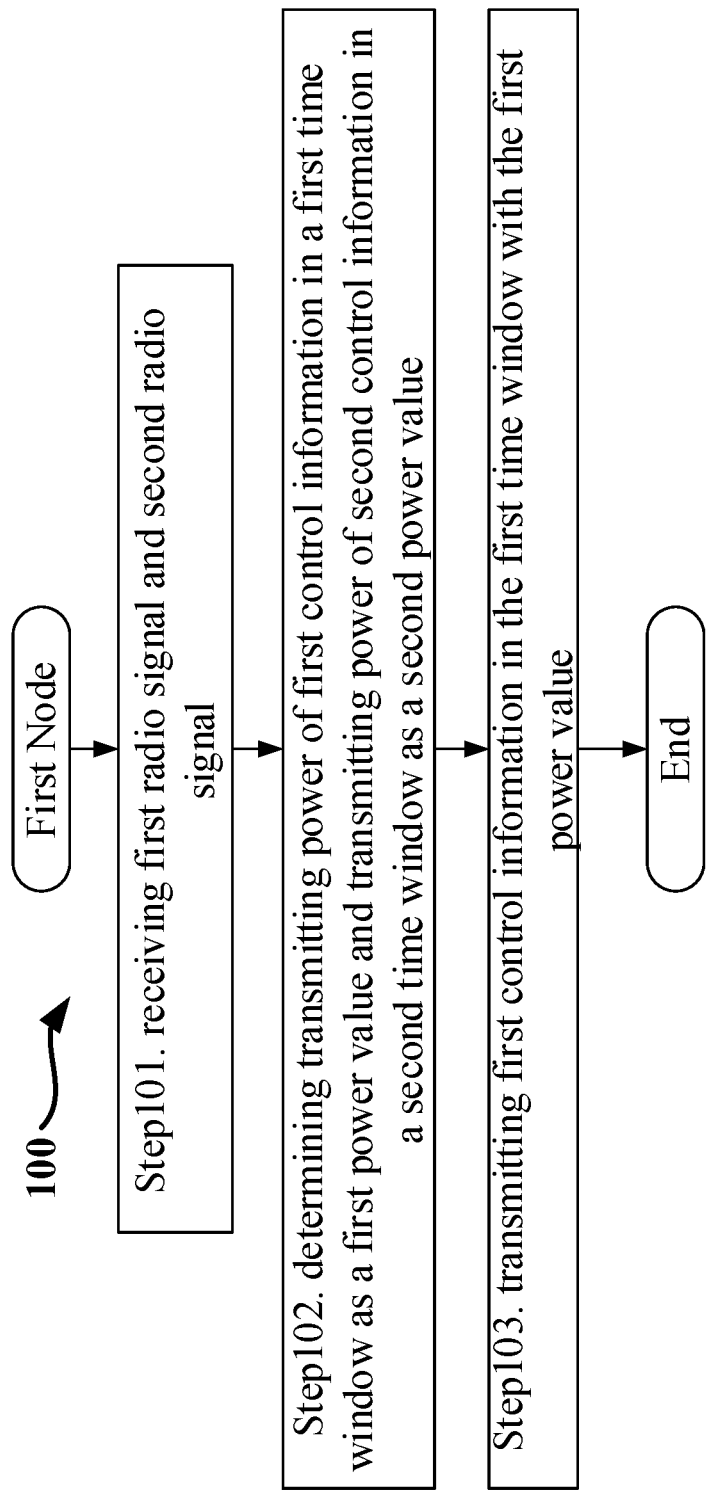
FIG. 1 illustrates a flowchart of processing of a first node according to one embodiment of the present disclosure.

Embodiment 1 illustrates a flowchart of processing of a first node, as shown in FIG. 1. In step 100 of FIG. 1, each box represents a step. In Embodiment 1, the first node of the present disclosure receives a first radio signal and a second radio signal in step 101; determines a transmitting power of first control information in a first time window as a first power value and a transmitting power of second control information in a second time window as a second power value in step 102; and transmits first control information with the first power value in the first time window.

In Embodiment 1, the first control information is associated with the first radio signal, and the second control information is associated with the second radio signal; the first radio signal is unicast, while the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

In one embodiment, the above phrase that a physical layer channel format occupied by the first control information is the same as a physical layer channel format occupied by the second control information means that the physical layer channel format occupied by the first control information and the physical layer channel format occupied by the second control information are both PSFCHs.

In one embodiment, the first control information and the second control information are both HARQ-ACKs.

In one embodiment, the first control information is feedback for unicast.

In one embodiment, the second control information is feedback for groupcast.

In one embodiment, the first control information comprises a HARQ-ACK of the first radio signal.

In one embodiment, the second control information comprises a HARQ-ACK of the second radio signal.

In one embodiment, the second control information comprises a NACK of the second radio signal.

In one embodiment, the first radio signal is a Physical Sidelink Shared Channel (PSSCH) based on unicast transmission.

In one embodiment, the second radio signal is a PSSCH based on groupcast transmission.

In one embodiment, a first Transmission Block (TB) is used to generate the first radio signal, a second TB is used to generate the second radio signal, the first TB and the second TB are different from each other.

In one embodiment, the above phrase that the first control information is associated with the first radio signal means that the first control information is used to determine whether the first radio signal is correctly decoded.

In one embodiment, the above phrase that the second control information is associated with the second radio signal means that the second control information is used to determine whether the second radio signal is correctly decoded.

In one embodiment, the above phrase that the second control information is associated with the second radio signal means that the second control information is used to determine that the second radio signal is incorrectly decoded.

In one embodiment, the above phrase that the first control information is associated with the first radio signal means that a measurement on the first radio signal is used to generate the first control information.

In one embodiment, the above phrase that the second control information is associated with the second radio signal means that a measurement on the second radio signal is used to generate the second control information.

In one embodiment, the above phrase that the first control information is associated with the first radio signal means that the first control information is used to determine that the first radio signal is correctly received, or the first control information is used to determine that the first radio signal is incorrectly received.

In one embodiment, the above phrase that the second control information is associated with the second radio signal means that the second control information is used to determine that the second radio signal is correctly received, or the second control information is used to determine that the second radio signal is incorrectly received.

In one embodiment, the above phrase that the second control information is associated with the second radio signal means that the second control information is only used to determine that the second radio signal is incorrectly received.

In one embodiment, the above phrase that the first control information is associated with the first radio signal means that the first control information is Channel State Information (CSI) acquired by referring to the first radio signal.

In one embodiment, the above phrase that the first control information is associated with the first radio signal means that the second control information is CSI acquired by referring to the second radio signal.

In one embodiment, a second node transmits the first radio signal, and a third node transmits the second radio signal, the second node and the third node are non-co-located.

In one subembodiment of the above embodiment, the second node is a terminal.

In one subembodiment of the above embodiment, the third node is a terminal.

In one subembodiment of the above embodiment, the third node is a Group Head.

In one subembodiment of the above embodiment, the above phrase that the second node and the third node are non-co-located includes at least one of the following meanings:

The second node and the third node are different communication devices;

The second node and the third node respectively correspond to difference Identifiers (ID);

The second node and the third node are located at different places;

There is no wired connection between the second node and the third node.

In one embodiment, the first power value is equal to a first expected power value, the first expected power value is an expected power value of the first control information without power scaling.

In one subembodiment, the first expected power value is related to a pathloss between the second node and the first node.

In one embodiment, the second power value is no greater than a second expected power value, the second expected power value is an expected power value of the second control information without power scaling.

In one subembodiment, the second expected power value is related to a pathloss between the third node and the first node.

In one embodiment, the first control information and the second control information are transmitted on a sidelink.

In one embodiment, the first control information and the second control information are transmitted on a PC-5 link.

In one embodiment, the first radio signal and the second radio signal are transmitted on a sidelink.

In one embodiment, the first radio signal and the second radio signal are transmitted on a PC-5 link.

In one embodiment, a first signaling is used to schedule the first radio signal, and the second signaling is used to schedule the second radio signal, the first signaling is identified by a first identity, and the second signaling is identified by a second identity, the first identity and the second identity respectively indicate unicast and groupcast.

In one embodiment, the first radio signal and the second radio signal are respectively identified by a first identity and a second identity, and the first identity and the second identity respectively indicate unicast and groupcast.

In one embodiment, the first identity and the second identity of the present disclosure are both Radio Network Temporary Identifiers (RNTIs).

In one subembodiment, the first identity and the second identity respectively correspond to different RNTIs.

In one subembodiment, the first identity is specific to the first node.

In one subembodiment, the second identity is specific to a terminal group, and the first node belongs to the terminal group.

In one embodiment, the first power value is greater than the second power value.

In one embodiment, the first power value is greater than 0, and the second power value is greater than or equal to 0.

In one embodiment, the first power value and the second power value are measured by dBm.

In one embodiment, the first power value and the second power value are measured by mW.

In one embodiment, the above phrase that the first power value is unrelated to the second power value means that the first power value is not affected by the second power value.

In one embodiment, the above phrase that the first power value is unrelated to the second power value means that the second power value is not used to determine the first power value.

In one embodiment, the above phrase that the first power value is unrelated to the second power value means that the first power value is first allocated to the first node.

In one embodiment, the above phrase that the first power value is unrelated to the second power value means that the second power value is allocated to the first node after allocation of the first power value is completed.

In one embodiment, the above phrase that the first power value is unrelated to the second power value means that the first power value is used to determine the second power value.

In one embodiment, the first time window is a slot.
In one embodiment, the first time window is a mini-slot.
In one embodiment, the first time window is a subframe.
In one embodiment, the second time window is a slot.
In one embodiment, the second time window is a mini-slot.
In one embodiment, the second time window is a subframe.

Embodiment 2

Figure 2:
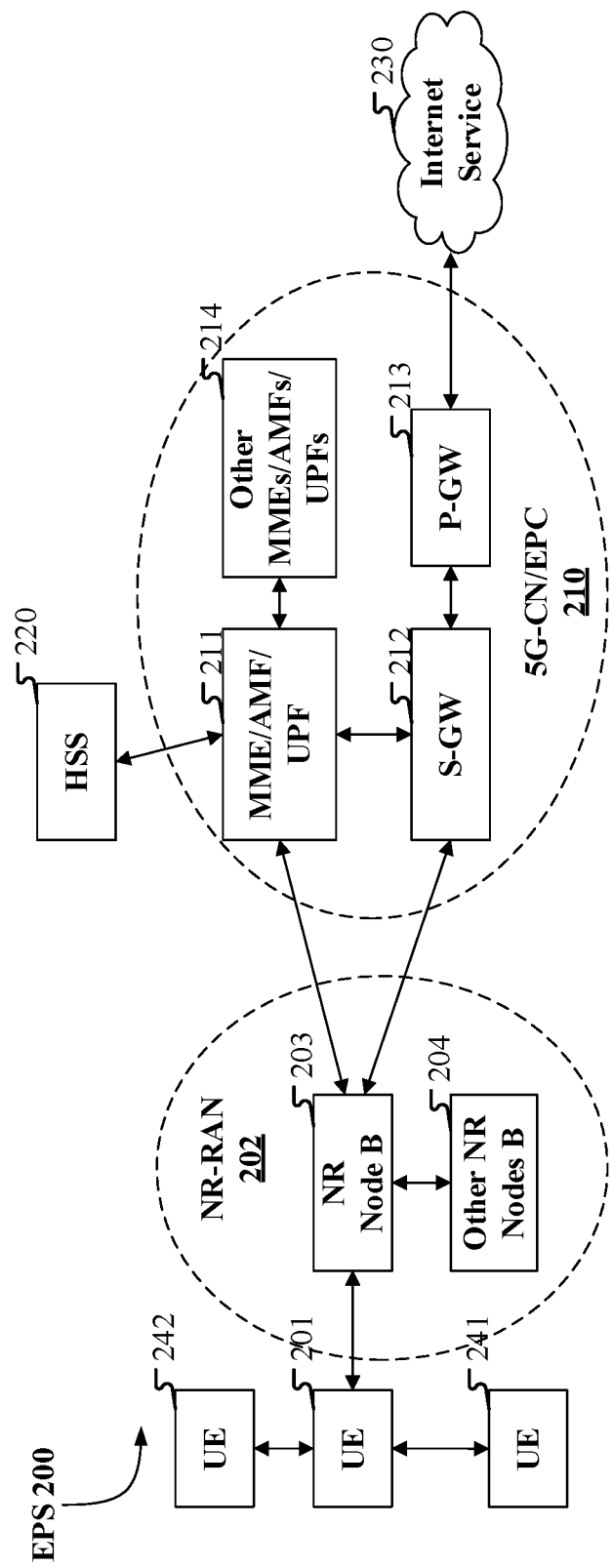
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other appropriate terms. The EPS 200 may comprise one or more UEs 201, as well as a UE 241 in sidelink communication with the UE 201 and a UE 242 in sidelink communication with the UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node of the present disclosure.

In one embodiment, the UE 241 corresponds to the second node of the present disclosure.

In one embodiment, the UE 242 corresponds to the third node of the present disclosure.

In one embodiment, the gNB 203 corresponds to the fourth node of the present disclosure.

In one embodiment, an air interface between the UE 201 and the gNB 203 is a Uu interface.

In one embodiment, an air interface between the UE 201 and the UE 241 is a PC-5 interface.

In one embodiment, an air interface between the UE 201 and the UE 242 is a PC-5 interface.

In one embodiment, a radio link between the UE 201 and the gNB 203 is a cellular link.

In one embodiment, a radio link between the UE 201 and the UE 241 is a sidelink.

In one embodiment, a radio link between the UE 201 and the UE 242 is a sidelink.

In one embodiment, the second node of the present disclosure is a terminal within the coverage of the gNB 203.

In one embodiment, the second node of the present disclosure is a terminal out of the coverage of the gNB 203.

In one embodiment, the third node of the present disclosure is a terminal within the coverage of the gNB 203.

In one embodiment, the third node of the present disclosure is a terminal out of the coverage of the gNB 203.

In one embodiment, the first node and the second node belong to a V2X pair.

In one embodiment, the first node and the second node communicate through unicast-based V2X communications.

In one embodiment, the first node and the third node belong to a terminal group.

In one embodiment, the first node and the third node communicate through groupcast-based V2X communications.

In one embodiment, the first node is an automobile.

In one embodiment, the second node is an automobile.

In one embodiment, the third node is an automobile.

In one embodiment, the first node is a vehicle.

In one embodiment, the second node is a vehicle.

In one embodiment, the third node is a vehicle.

In one embodiment, the fourth node is a base station.

In one embodiment, the third node is a Road Side Unit (RSU).

In one embodiment, the third node is a Group Head of a terminal group.

Embodiment 3

Figure 3:
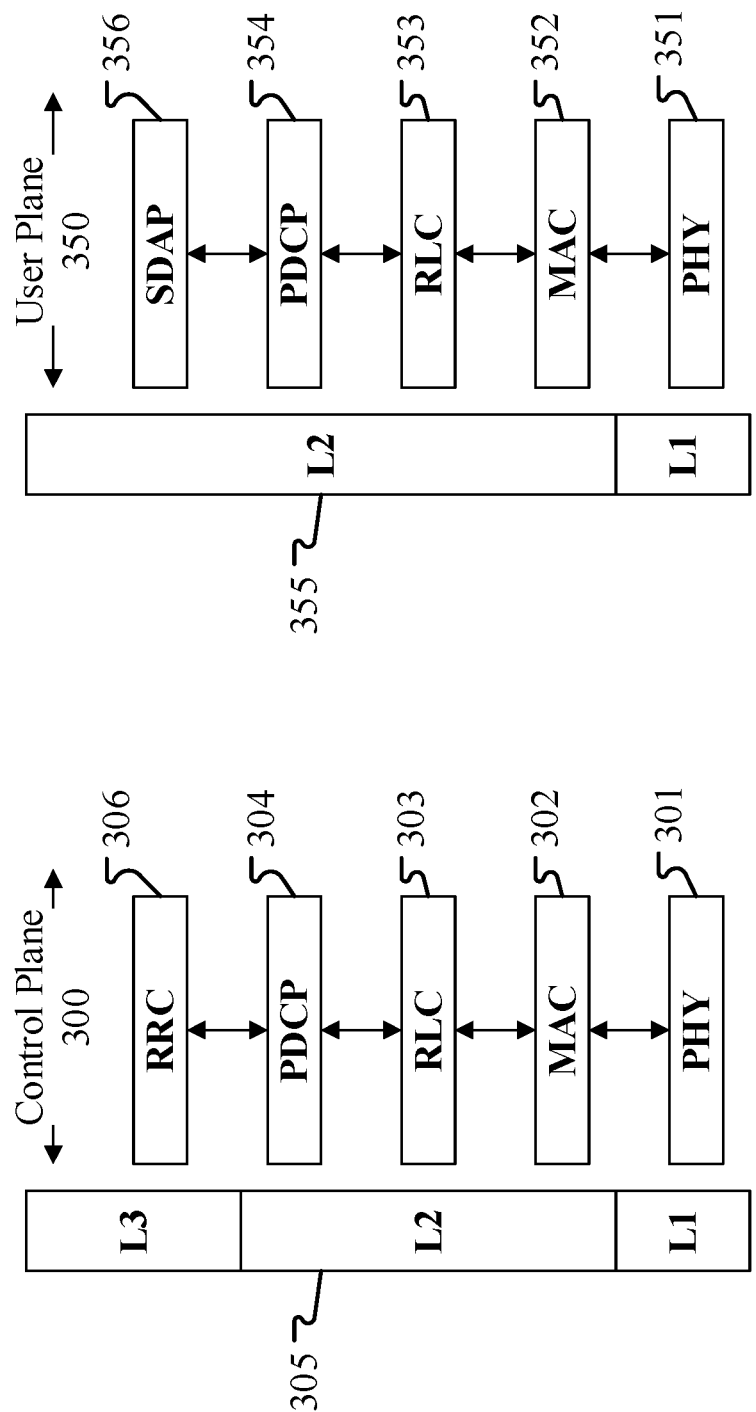
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3. FIG. 3 is a schematic diagram illustrating a radio protocol architecture of a user plane 350 and a control plane 300. In FIG. 3, the radio protocol architecture for a control plane 300 between a first communication node (UE, gNB or RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node, and between two UEs via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing between varied radio bearers and logical channels. The PDCP sublayer 304 also provides security by encrypting a packet and provides support for the handover of first communication node between second communication nodes. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, a Radio Resource Control (RRC) sublayer 306 in layer 3 (L3 layer) is responsible for acquiring radio resources (i.e., radio bearer) and configuring the lower layer using an RRC signaling between the second communication node and the first communication node. A radio protocol architecture for the user plane 350 comprises a layer 1 (L1) and a layer 2 (L2). In the user plane 350, the radio protocol architecture used for the first communication node and the second communication node applied in a physical layer 351, a PDCP sublayer 354 in the L2 layer 355, a RLC sublayer 353 in the L2 layer 355 and a MAC sublayer 352 in the L2 layer 355 is almost the same as that applied in counterpart layers and sublayers in the control plane 300. But the PDCP sublayer 354 also provides header compression for a higher-layer packet to reduce radio transmission overhead. The L2 layer 355 in the user plane 350 also comprises a Service Data Adaptation Protocol (SDAP) sublayer 356, and the SDAP sublayer 356 is in charge of the mapping from QoS stream to Data Radio Bearer (DRB) as a way to support diversity in traffic. Although not described in FIG. 3, the UE may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node of the present disclosure.

In one embodiment, the radio protocol architecture in FIG. 3 is applicable to the second node of the present disclosure.

In one embodiment, the radio protocol architecture in FIG. 3 is applicable to the third node of the present disclosure.

In one embodiment, the radio protocol architecture in FIG. 3 is applicable to the fourth node of the present disclosure.

In one embodiment, the first radio signal is generated by the PHY 301 or the PHY 351.

In one embodiment, the first radio signal is generated by the MAC 352 or the MAC 302.

In one embodiment, the second radio signal is generated by the PHY 301 or the PHY 351.

In one embodiment, the second radio signal is generated by the MAC 352 or the MAC 302.

In one embodiment, the first control information is generated by the PHY 301 or the PHY 351.

In one embodiment, the first control information is generated by the MAC 352 or the MAC 302.

In one embodiment, the second control information is generated by the PHY 301, or the PHY 351.

In one embodiment, the second control information is generated by the MAC 352 or the MAC 302.

In one embodiment, the third radio signal is generated by the PHY 301 or the PHY 351.

In one embodiment, the third radio signal is generated by the MAC 352 or the MAC 302.

In one embodiment, the fourth radio signal is generated by the PHY 301 or the PHY 351.

In one embodiment, the fourth radio signal is generated by the MAC 352 or the MAC 302.

In one embodiment, the first signaling is generated by the PHY 301 or the PHY 351.

In one embodiment, the second signaling is generated by the PHY 301 or the PHY 351.

In one embodiment, the target radio signal is generated by the PHY 301 or the PHY 351.

In one embodiment, the target radio signal is generated by the MAC 352 or the MAC 302.

Embodiment 4

Figure 4:
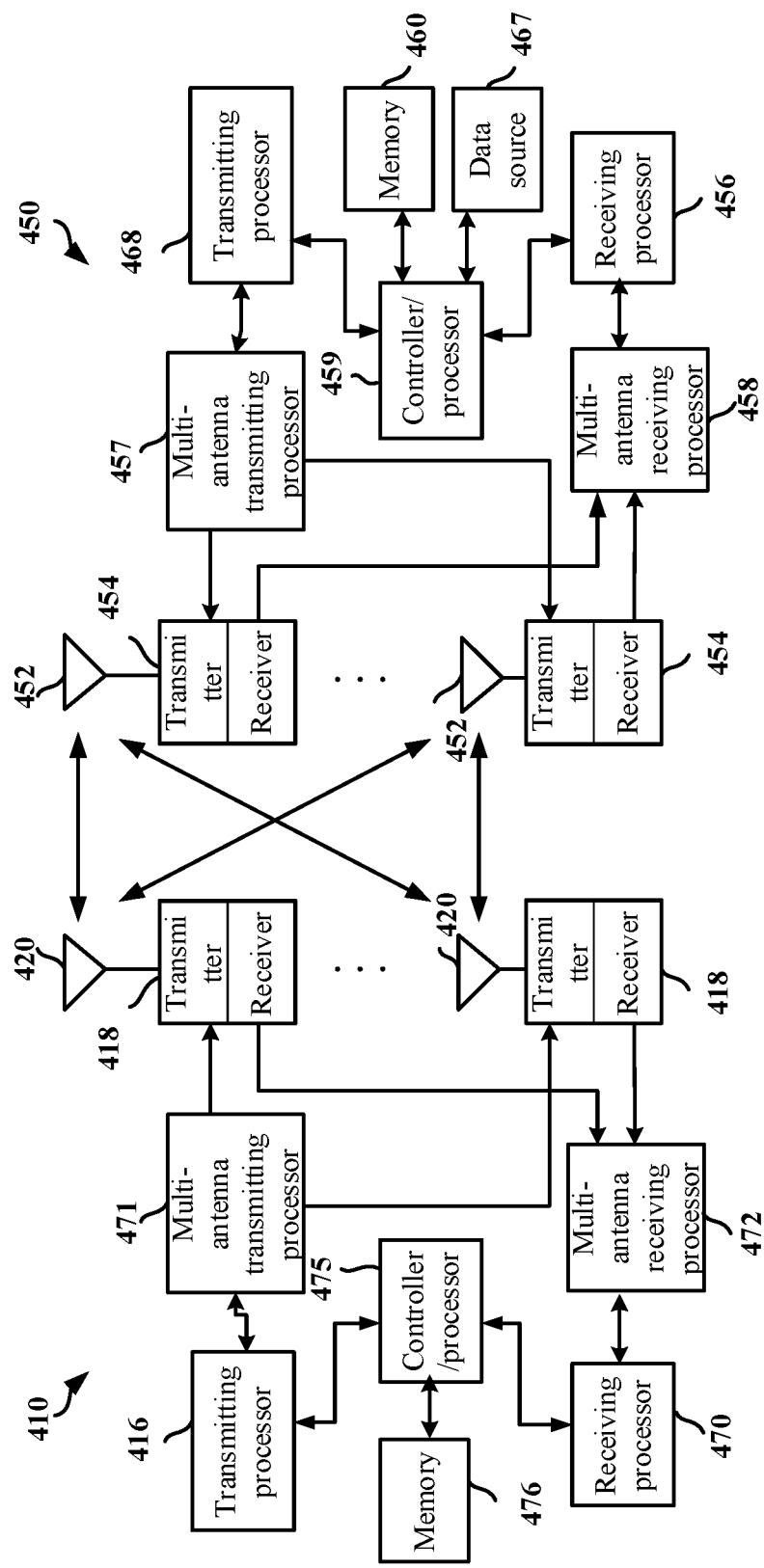
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first radio signal and a second radio signal; determines a transmitting power of first control information in a first time window as a first power value and a transmitting power of second control information in a second time window as a second power value; and transmits first control information with the first power value in the first time window; the first control information is associated with the first radio signal, and the second control information is associated with the second radio signal; the first radio signal is unicast, while the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

In one embodiment, the first communication device 450 comprises a memory that stores a computer readable instruction program. The computer readable instruction program generates an action when executed by at least one processor. The action includes receiving a first radio signal and a second radio signal; determining a transmitting power of first control information in a first time window as a first power value and a transmitting power of second control information in a second time window as a second power value; and transmitting first control information with the first power value in the first time window; the first control information is associated with the first radio signal, and the second control information is associated with the second radio signal; the first radio signal is unicast, while the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a first radio signal; and receives first control information in a first time window; the first control information is associated with the first radio signal, the first radio signal is unicast; a transmitting power of the first control information in the first time window is a first power value; a transmitter of the first control information determines a transmitting power of second control information in a second time window as a second power value, the second control information is associated with the second radio signal, and the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

In one embodiment, the second communication device 410 comprises a memory that stores a computer readable instruction program. The computer readable instruction program generates an action when executed by at least one processor. The action includes transmitting a first radio signal; and receiving first control information in a first time window; the first control information is associated with the first radio signal, the first radio signal is unicast; a transmitting power of the first control information in the first time window is a first power value; a transmitter of the first control information determines a transmitting power of second control information in a second time window as a second power value, the second control information is associated with the second radio signal, and the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits a second radio signal; and receives second control information in a second time window; the second control information is associated with the second radio signal, the second radio signal is groupcast; a transmitting power of the second control information in the second time window is a second power value; a transmitter of the second control information determines a transmitting power of first control information in a first time window as a first power value, the first control information is associated with the first radio signal, and the first radio signal is unicast; the first power value is unrelated to the second power value, the second power value is relevant to whether the first time window overlaps with the second time window; a physical layer channel format occupied by the first control information is the same as a physical layer channel format occupied by the second control information.

In one embodiment, the second communication device 410 comprises a memory that stores a computer readable instruction program. The computer readable instruction program generates an action when executed by at least one processor. The action includes transmitting a second radio signal; and receiving second control information in a second time window; the second control information is associated with the second radio signal, the second radio signal is groupcast; a transmitting power of the second control information in the second time window is a second power value; a transmitter of the second control information determines a transmitting power of first control information in a first time window as a first power value, the first control information is associated with the first radio signal, and the first radio signal is unicast; the first power value is unrelated to the second power value, the second power value is relevant to whether the first time window overlaps with the second time window; a physical layer channel format occupied by the first control information is the same as a physical layer channel format occupied by the second control information.

In one embodiment, the second communication device 410 comprises at least one processor and at least one memory. The at least one memory comprises computer program codes. The at least one memory and the computer program codes are configured to be used in collaboration with the at least one processor. The second communication device 410 at least receives a target radio signal in a target time window; a first radio signal and a second radio signal are transmitted in sidelink, while the target radio signal is transmitted on uplink; first control information is associated with the first radio signal, and second control information is associated with the second radio signal; the first radio signal is unicast, while the second radio signal is groupcast; both a transmitter of the first radio signal and a transmitter of the second radio signal are non-co-located with the fourth node; a transmitting power of the first control information in a first time window is a first power value, and a transmitting power of the second control information in a second time window is a second power value; the first power value is unrelated to the second power value, the second power value is relevant to whether the first time window overlaps with the second time window; a physical layer channel format occupied by the first control information is the same as a physical layer channel format occupied by the second control information; the first power value is relevant to whether the first time window overlaps with the target time window, the target power value is unrelated to the first power value.

In one embodiment, the second communication device 410 comprises a memory that stores a computer readable instruction program. The computer readable instruction program generates an action when executed by at least one processor. The action includes receiving a target radio signal in a target time window; a first radio signal and a second radio signal are transmitted in sidelink, while the target radio signal is transmitted on uplink; first control information is associated with the first radio signal, and second control information is associated with the second radio signal; the first radio signal is unicast, while the second radio signal is groupcast; both a transmitter of the first radio signal and a transmitter of the second radio signal are non-co-located with the fourth node; a transmitting power of the first control information in a first time window is a first power value, and a transmitting power of the second control information in a second time window is a second power value; the first power value is unrelated to the second power value, the second power value is relevant to whether the first time window overlaps with the second time window; a physical layer channel format occupied by the first control information is the same as a physical layer channel format occupied by the second control information; the first power value is relevant to whether the first time window overlaps with the target time window, the target power value is unrelated to the first power value.

In one embodiment, the first communication device 450 corresponds to the first node of the present disclosure.

In one embodiment, the second communication device 410 corresponds to the second node of the present disclosure.

In one embodiment, the second communication device 410 corresponds to the third node of the present disclosure.

In one embodiment, the second communication device 410 corresponds to the fourth node of the present disclosure.

In one embodiment, the first communication device 450 is a UE.

In one embodiment, the second communication device 410 is a UE.

In one embodiment, the second communication device 410 is a base station.

In one embodiment, at least one of the antenna 452, the receiver 454, the multi-antenna receiving processor 458, the receiving processor 456, or the controller/processor 459 is used to receive a first radio signal and a second radio signal; at least one of the antenna 420, the transmitter 418, the multi-antenna transmitting processor 471, the transmitting processor 416, or the controller/processor 475 is used to transmit a first radio signal and a second radio signal.

In one embodiment, at least one of the antenna 452, the transmitter 454, the multi-antenna transmitting processor 457, the transmitting processor 468, or the controller/processor 459 is used to determine a transmitting power of first control information in a first time window as a first power value and a transmitting power of second control information in a second time window as a second power value.

In one embodiment, at least one of the antenna 452, the transmitter 454, the multi-antenna transmitting processor 457, the transmitting processor 468, or the controller/processor 459 is used to transmit first control information with the first power value in the first time window; at least one of the antenna 420, the receiver 418, the multi-antenna receiving processor 472, the receiving processor 470, or the controller/processor 475 is used to receive the first control information in the first time window.

In one embodiment, at least one of the antenna 452, the transmitter 454, the multi-antenna transmitting processor 457, the transmitting processor 468, or the controller/processor 459 is used to transmit second control information with the second power value in the second time window.

In one embodiment, at least one of the antenna 452, the transmitter 454, the multi-antenna transmitting processor 457, the transmitting processor 468, or the controller/processor 459 is used to drop transmitting second control information in the second time window when the first time window overlaps with the second time window, the second power value being 0.

In one embodiment, at least one of the antenna 452, the transmitter 454, the multi-antenna transmitting processor 457, the transmitting processor 468, or the controller/processor 459 is used to transmit second control information with the second power in the second time window when the first time window does not overlap with the second time window, the second power value being unrelated to the first power value.

In one embodiment, at least one of the antenna 420, the receiver 418, the multi-antenna receiving processor 472, the receiving processor 470, or the controller/processor 475 is used to receive second control information in the second time window.

In one embodiment, at least one of the antenna 452, the transmitter 454, the multi-antenna transmitting processor 457, the transmitting processor 468, or the controller/processor 459 is used to transmit a target radio signal with a target power value in a target time window; at least one of the antenna 420, the receiver 418, the multi-antenna receiving processor 472, the receiving processor 470, or the controller/processor 475 is used to receive a target radio signal in a target time window.

In one embodiment, at least one of the antenna 452, the receiver 454, the multi-antenna receiving processor 458, the receiving processor 456, or the controller/processor 459 is used to receive a third radio signal; at least one of the antenna 420, the transmitter 418, the multi-antenna transmitting processor 471, the transmitting processor 416, or the controller/processor 475 is used to transmit a third radio signal.

In one embodiment, at least one of the antenna 452, the receiver 454, the multi-antenna receiving processor 458, the receiving processor 456, or the controller/processor 459 is used to receive a fourth radio signal; at least one of the antenna 420, the transmitter 418, the multi-antenna transmitting processor 471, the transmitting processor 416, or the controller/processor 475 is used to transmit a fourth radio signal.

In one embodiment, at least one of the antenna 452, the receiver 454, the multi-antenna receiving processor 458, the receiving processor 456, or the controller/processor 459 is used to receive a first signaling; at least one of the antenna 420, the transmitter 418, the multi-antenna transmitting processor 471, the transmitting processor 416, or the controller/processor 475 is used to transmit a first signaling.

In one embodiment, at least one of the antenna 452, the receiver 454, the multi-antenna receiving processor 458, the receiving processor 456, or the controller/processor 459 is used to receive a second signaling; at least one of the antenna 420, the transmitter 418, the multi-antenna transmitting processor 471, the transmitting processor 416, or the controller/processor 475 is used to transmit a second signaling.

Embodiment 5

Figure 5:
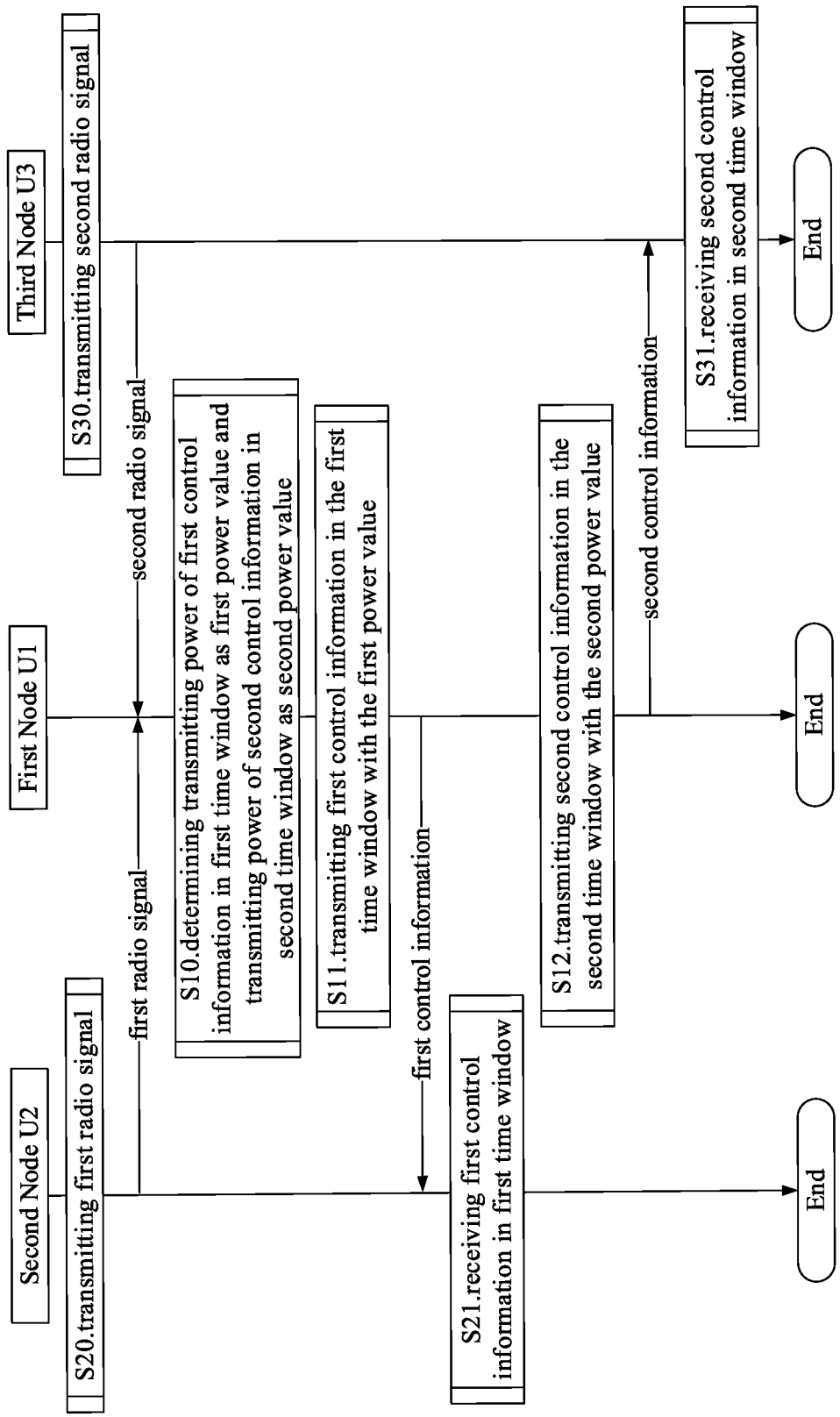
FIG. 5 illustrates a flowchart of first control information and second control information according to one embodiment of the present disclosure.

Embodiment 5 illustrates a flowchart of first control information and second control information, as shown in FIG. 5. In FIG. 5, a first node U1 and a second node U2 are in communication via sidelink, and a first node U1 and a third node U3 are in communication via sidelink.

The first node U1 receives a first radio signal and a second radio signal in step S10; determines a transmitting power of first control information in a first time window as a first power value and a transmitting power of second control in a second time window as a second power value in step S11; transmits first control information in the first time window with the first power value in step S12; and transmits second control information in the second time window with the second power value in step S13.

The second node U2 transmits a first radio signal in step S20; and receives first control information in a first time window in step S21.

The third node U3 transmits a second radio signal in step S30; and receives second control information in a second time window in step S31.

In Embodiment 5, the first control information is associated with the first radio signal, and the second control information is associated with the second radio signal; the first radio signal is unicast, while the second radio signal is groupcast; the first power value is unrelated to the second power value, the second power value is relevant to whether the first time window overlaps with the second time window; a physical layer channel format occupied by the first control information is the same as a physical layer channel format occupied by the second control information; when the first time window overlaps with the second time window, a difference between a first remaining power value and the first power value is used to determine the second power value; when the first time window does not overlap with the second time window, the second power value is unrelated to the first power value.

In one embodiment, the first remaining power value is measured by dBm.

In one embodiment, the first remaining power value is measured by mW.

In one embodiment, the second power value is equal to a difference between the first remaining power value and the first power value.

In one embodiment, the first remaining power value is a transmitting power value acquired from a maximum transmitting power value minus a total transmitting power value of all radio signals other than the first control information and the second control information.

In one subembodiment, the maximum transmitting power value is measured by dBm, or the maximum transmitting power value is measured by mW.

In one subembodiment, the maximum transmitting power value is 23 dBm.

In one subembodiment, the maximum transmitting power value is a sum of 23 dBm and a first offset.

In one subsidiary embodiment of the above subembodiment, the first offset is configurable.

In one subsidiary embodiment of the above subembodiment, the first offset is dependent on a first frequency band, the first control information and the second control information are transmitted on the first frequency band.

In one subembodiment, the maximum transmitting power value is a largest power value of the first node that can be used for sidelink transmission on the first frequency band, the first control information and the second control information are transmitted on the first frequency band.

In one subembodiment, any radio signal of all radio signals other than the first control information and the second control information is of a higher priority than the first control information and the second control information.

In one embodiment, the above phrase that the first time window overlaps with the second time window means that at least one multicarrier symbol belongs to the first time window and the second time window simultaneously.

In one embodiment, the above phrase that the first time window does not overlap with the second time window means that there is no multicarrier symbol that belongs to the first time window and the second time window simultaneously.

In one embodiment, the multicarrier symbol of the present disclosure is an Orthogonal Frequency Division Multiplexing (OFDM) symbol.

In one embodiment, the multicarrier symbol of the present disclosure is a SC— Single Carrier-Frequency Division Multiple Access (FDMA) symbol.

In one embodiment, the multicarrier symbol of the present disclosure is a Filter Bank Multi Carrier (FBMC) symbol.

In one embodiment, the multicarrier symbol of the present disclosure is a Cyclic Prefix (CP).

Embodiment 6

Figure 6:
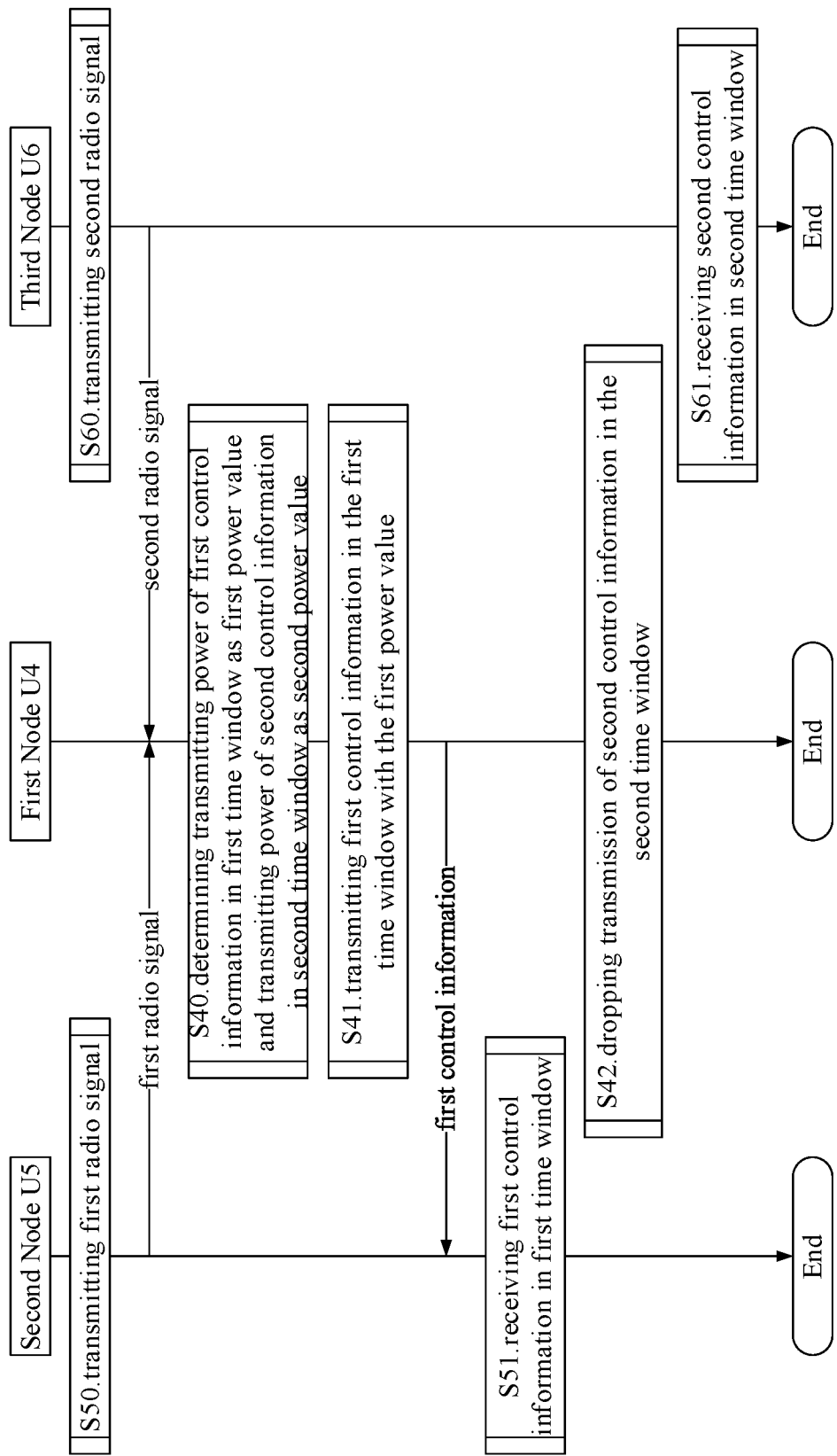
FIG. 6 illustrates a flowchart of first control information and second control information according to one embodiment of the present disclosure.

Embodiment 6 illustrates another flowchart of first control information and second control information, as shown in FIG. 6. In FIG. 6, a first node U4 and a second node U5 are in communication via sidelink, and a first node U4 and a third node U6 are in communication via sidelink. The embodiments in Embodiment 6 can be applied to Embodiment 5 if no conflict is incurred.

The first node U4 receives a first radio signal and a second radio signal in step S40; determines a transmitting power of first control information in a first time window as a first power value and a transmitting power of second control in a second time window as a second power value in step S41; transmits first control information in the first time window with the first power value in step S42; and drops transmitting second control information in the second time window in step S43.

The second node U5 transmits a first radio signal in step S50; and receives first control information in a first time window in step S51.

The third node U6 transmits a second radio signal in step S60; and receives second control information in a second time window in step S61.

In Embodiment 6, the first control information is associated with the first radio signal, and the second control information is associated with the second radio signal; the first radio signal is unicast, while the second radio signal is groupcast; the first power value is unrelated to the second power value, the second power value is relevant to whether the first time window overlaps with the second time window; a physical layer channel format occupied by the first control information is the same as a physical layer channel format occupied by the second control information; the first time window is overlapped with the second time window, the second power value is 0.

In one embodiment, the above phrase that the first node U4 drops transmitting second control information in the second time window means that the first node U4 does not transmit the second control information in the second time window.

In one embodiment, the above phrase that the first node U4 drops transmitting second control information in the second time window means that the first node U4 defers the transmission of the second control information.

In one embodiment, the above phrase that the first node U4 drops transmitting second control information in the second time window means that the first node U4 stores the second control information in buffer, and transmits the second control information in a time window behind the second time window.

Embodiment 7

Figure 7:
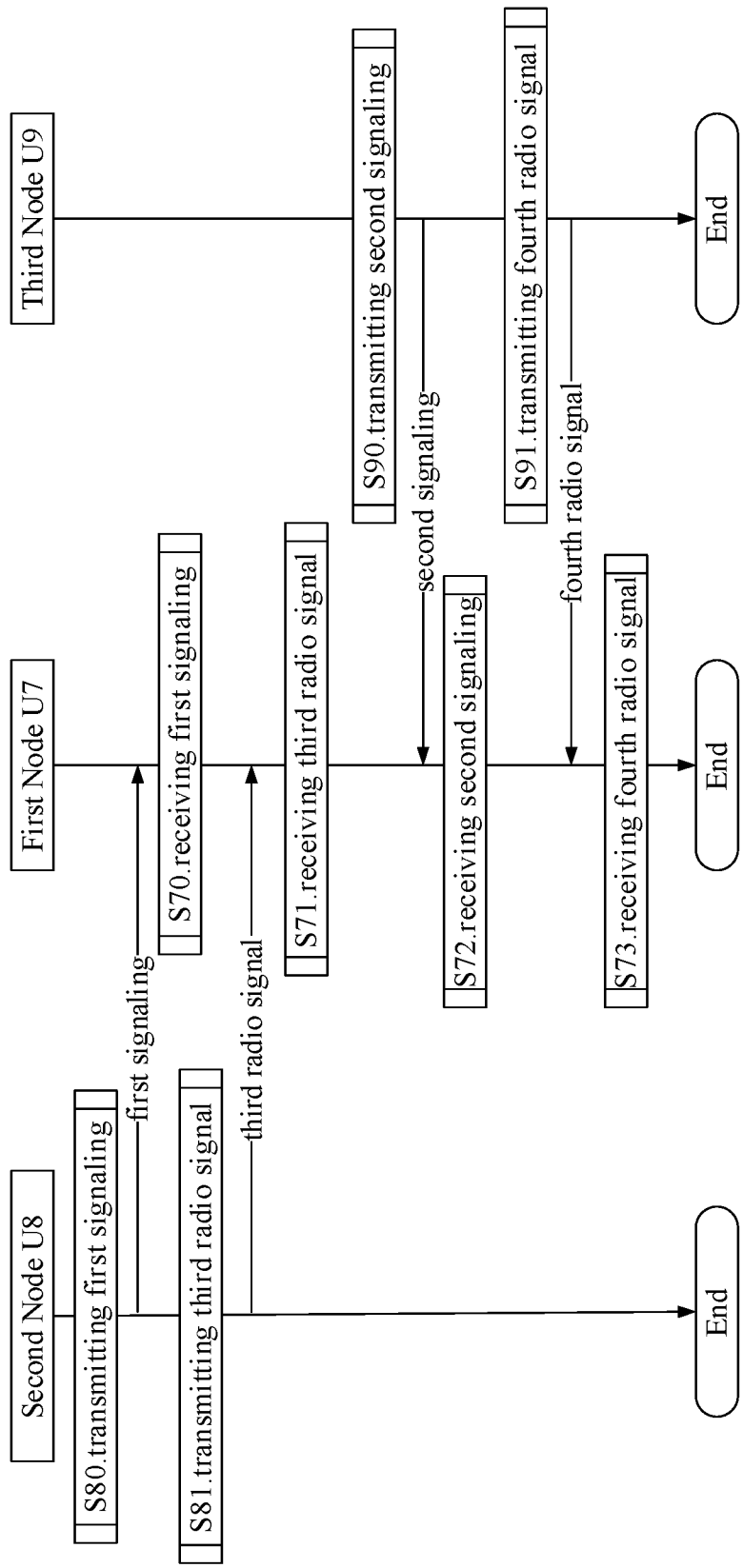
FIG. 7 illustrates a flowchart of a third radio signal and a fourth radio signal according to one embodiment of the present disclosure.

Embodiment 7 illustrates a flowchart of a third radio signal and a fourth radio signal, as shown in FIG. 7. In FIG. 7, a first node U7 and a second node U8 are in communication via sidelink, and a first node U7 and a third node U8 are in communication via sidelink. The embodiments in Embodiment 7 can be applied to Embodiment 5 if no conflict is incurred.

The first node U7 receives a first signaling in step S70, receives a third radio signal in step S71; receives a second signaling in step S72; and receives a fourth radio signal in step S73.

The second node U8 transmits a first signaling in step S80; and transmits a third radio signal in step S81.

The third node U9 transmits a second signaling in step S90; and transmits a fourth radio signal in step S91.

In Embodiment 7, the first signaling comprises configuration of the first radio signal, the configuration information comprises at least one of time domain resources occupied, frequency domain resources occupied, an MCS or an RV; the second signaling comprises configuration information of the second radio signal, the configuration information comprises at least one of time domain resources, frequency domain resources, an MCS or an RV; the third radio signal is used to determine a first expected power value, and the fourth radio signal is used to determine a second expected power value; the first power value is equal to the first expected power value, and the second power value is less than the second expected power value.

In one embodiment, the third radio signal is used to determine a pathloss from the second node to the first node, and the pathloss from the second node to the first node is used to determine the first expected power value.

In one embodiment, the fourth radio signal is used to determine a pathloss from the third node to the first node, and the pathloss from the third node to the first node is used to determine the second expected power value.

In one embodiment, the third radio signal includes a Channel State Information Reference Signal (CSI-RS) in sidelink.

In one embodiment, the fourth radio signal includes a CSI-RS in sidelink.

In one embodiment, the first radio signal includes the third radio signal.

In one embodiment, the second radio signal includes the fourth radio signal.

In one embodiment, the first expected power value is measured by dBm.

In one embodiment, the first expected power value is measured by mW.

In one embodiment, the second expected power value is measured by dBm.

In one embodiment, the second expected power value is measured by mW.

Embodiment 8

Figure 8:
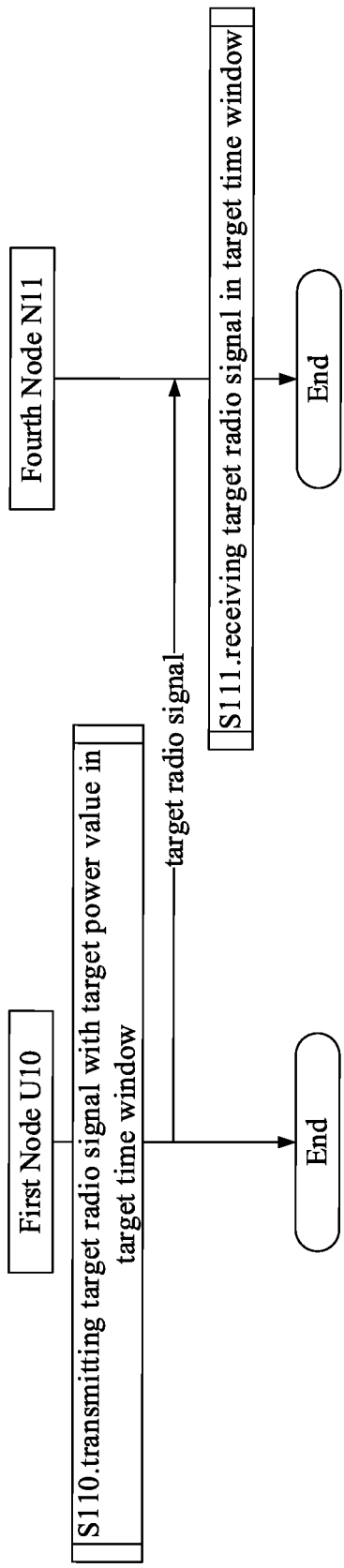
FIG. 8 illustrates a flowchart of a target radio signal according to one embodiment of the present disclosure.

Embodiment 8 illustrates a flowchart of a target radio signal, as shown in FIG. 8. In FIG. 8, a first node U10 and a fourth node N11 are in communication via a cellular link. The embodiments in Embodiment 8 can be applied to Embodiment 5.

The first node U10 transmits a target radio signal with a target power value in a target time window in step S110.

The second node N11 receives a target radio signal in a target time window in step S111.

In Embodiment 8, the first radio signal of the present disclosure and the second radio signal of the present disclosure are transmitted in sidelink, while the target radio signal is transmitted on uplink; the first power value of the present disclosure is relevant to whether the first time window of the present disclosure overlaps with the target time window of the present disclosure, the target power value is unrelated to the first power value.

In one embodiment, the target power value is an expected transmitting power of the target radio signal without power scaling.

In one embodiment, the target power value is related to a pathloss on the uplink.

In one embodiment, the uplink is a Uu link.

In one embodiment, the uplink is a radio link from a terminal to a base station.

In one embodiment, when the first time window is overlapped with the target time window, a difference between a target remaining power value and the target power value is used to determine the first power value; when the first time window is non-overlapped with the target time window, the first power value is unrelated to the target power value.

In one subembodiment, the target remaining power value is a transmitting power value acquired from a maximum transmitting power value minus a total transmitting power value of all radio signals other than the target radio signal.

In one subsidiary embodiment of the above subembodiment, any radio signal of all radio signals other than the target radio signal is of a higher priority than the target radio signal.

In one embodiment, the phrase that the target power value is unrelated to the first power value includes the meanings that the target power value is not affected by the first power value.

In one embodiment, the phrase that the target power value is unrelated to the first power value includes the meanings that the first power value is not used to determine the target power value.

In one embodiment, the phrase that the target power value is unrelated to the first power value includes the meanings that the target power value is first allocated to the first node.

In one embodiment, the phrase that the target power value is unrelated to the first power value includes the meanings that the first power value is allocated to the first node after the allocation of the target power value is completed.

In one embodiment, the phrase that the target power value is unrelated to the first power value includes the meanings that the target power value is used to determine the first power value.

In one embodiment, a physical layer channel occupied by the target radio signal includes a Physical Uplink Control Channel (PUCCH).

In one embodiment, a physical layer channel occupied by the target radio signal includes a Physical Uplink Shared Channel (PUSCH).

In one embodiment, the target radio signal comprises Uplink Control Information (UCI).

Embodiment 9

Figure 9:
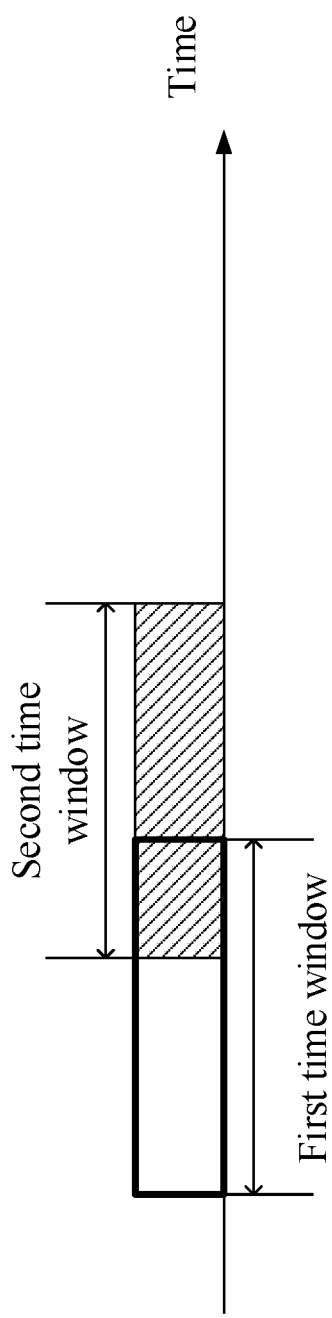
FIG. 9 illustrates a schematic diagram of a first time window and a second time window according to one embodiment of the present disclosure.

Embodiment 9 illustrates a schematic diagram of a first time window and a second time window, as shown in FIG. 9. In FIG. 9, the first time window and the second time window are overlapped in time domain.

In one embodiment, the first time window is a slot, or the first time window is a mini-slot, or the first time window is a subframe.

In one embodiment, the second time window is a slot, or the second time window is a mini-slot, or the second time window is a subframe.

In one embodiment, the first signaling is used to determine a position of the first time window in time domain.

In one embodiment, the second signaling is used to determine a position of the second time window in time domain.

In one embodiment, the first time window and the second time window respectively belong to two different time resources pools.

Embodiment 10

Figure 10:
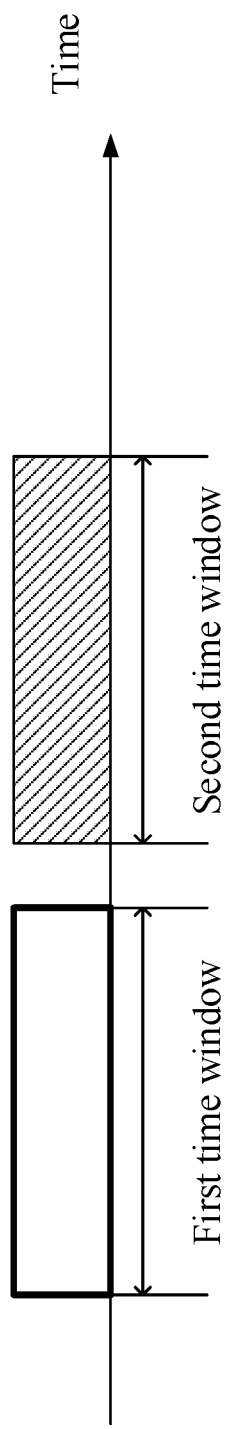
FIG. 10 illustrates a schematic diagram of a first time window and a second time window according to another embodiment of the present disclosure.

Embodiment 10 illustrates another schematic diagram of a first time window and a second time window, as shown in FIG. 10. In FIG. 10, the first time window and the second time window are non-overlapped in time domain.

In one embodiment, the first time window is a slot, or the first time window is a mini-slot, or the first time window is a subframe.

In one embodiment, the second time window is a slot, or the second time window is a mini-slot, or the second time window is a subframe.

In one embodiment, the first signaling is used to determine a position of the first time window in time domain.

In one embodiment, the second signaling is used to determine a position of the second time window in time domain.

In one embodiment, the first time window and the second time window respectively belong to two different time resources pools.

Embodiment 11

Figure 11:
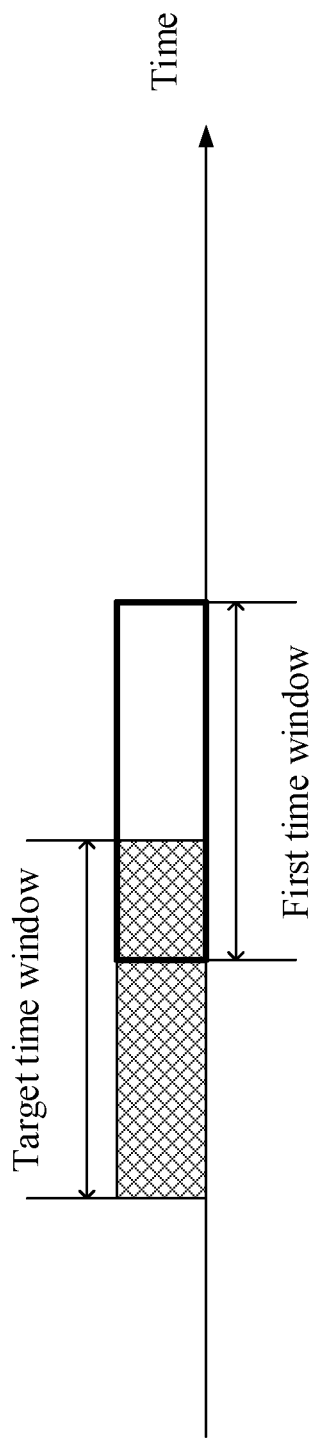
FIG. 11 illustrates a schematic diagram of a target time window and a first time window according to one embodiment of the present disclosure.

Embodiment 11 illustrates a schematic diagram of a target time window and a first time window, as shown in FIG. 11. In FIG. 11, the target time window is overlapped with the first time window in time domain.

In one embodiment, the target time window is a slot, or the target time window is a mini-slot, or the target time window is a subframe.

In one embodiment, a scheduling signaling of the target radio signal is used to determine a position of the target time window in time domain.

In one embodiment, the first time window and the target time window respectively belong to two different time resource pools.

Embodiment 12

Figure 12:
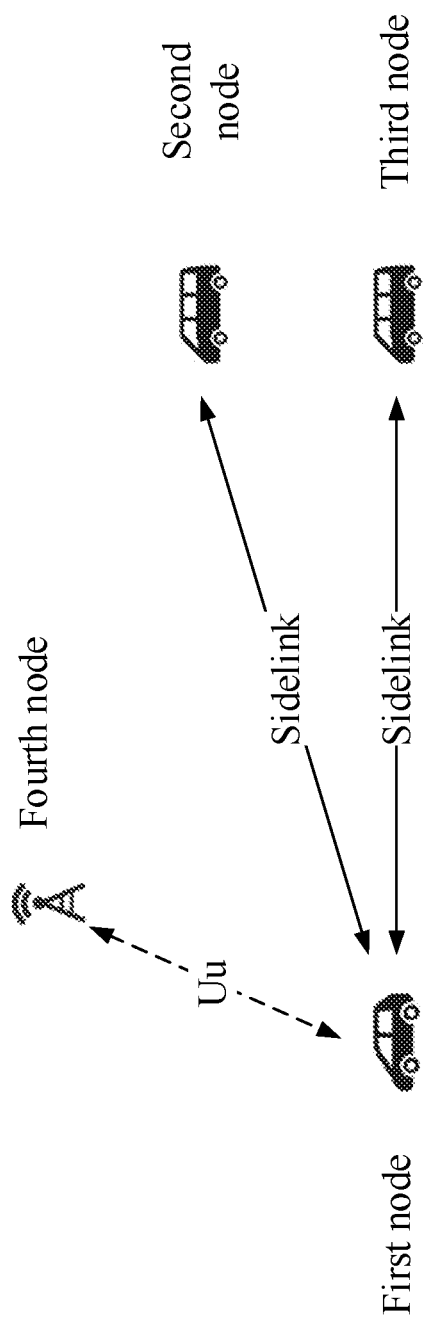
FIG. 12 illustrates a schematic diagram of a first node, a second node, a third node and a fourth node according to one embodiment of the present disclosure.

Embodiment 12 illustrates a schematic diagram of a first node, a second node, a third node and a fourth node, as shown in FIG. 12. The first node, the second node and the third node illustrated are terminals, and the fourth node is a base station. The first radio signal, a first signaling, a third radio signal and first control information of the present disclosure are transmitted between the first node and the second node in FIG. 12. The second radio signal, a second signaling, a fourth radio signal and second control information of the present disclosure are transmitted between the first node and the third node in FIG. 12. The target radio signal of the present disclosure is transmitted between the first node and the fourth node.

In one embodiment, the first signaling schedules the first radio signal, the first control information is used to determine whether the first radio signal is correctly received.

In one embodiment, the third radio signal is a CSI-RS in sidelink.

In one embodiment, the second signaling schedules the second radio signal, the second control information is used to determine whether the second radio signal is correctly received.

In one embodiment, the fourth radio signal is a CSI-RS in sidelink.

In one embodiment, a physical layer channel occupied by the target radio signal includes a PUCCH.

In one embodiment, a physical layer channel occupied by the target radio signal includes a PUSCH.

In one embodiment, a transport channel occupied by the target radio signal is an Uplink Shared Channel (UL-SCH).

In one embodiment, between the first node and the second node is unicast-based sidelink transmission.

In one embodiment, between the first node and the second node is groupcast-based sidelink transmission.

In one embodiment, the priority of power allocation of a radio signal transmitted between the first node and the fourth node is higher than that of a radio signal transmitted between the first node and the second node.

In one embodiment, the priority of power allocation of a radio signal transmitted between the first node and the fourth node is higher than that of a radio signal transmitted between the first node and the third node.

In one embodiment, the priority of power allocation of a radio signal transmitted between the first node and the second node is higher than that of a radio signal transmitted between the first node and the third node.

Embodiment 13

Figure 13:
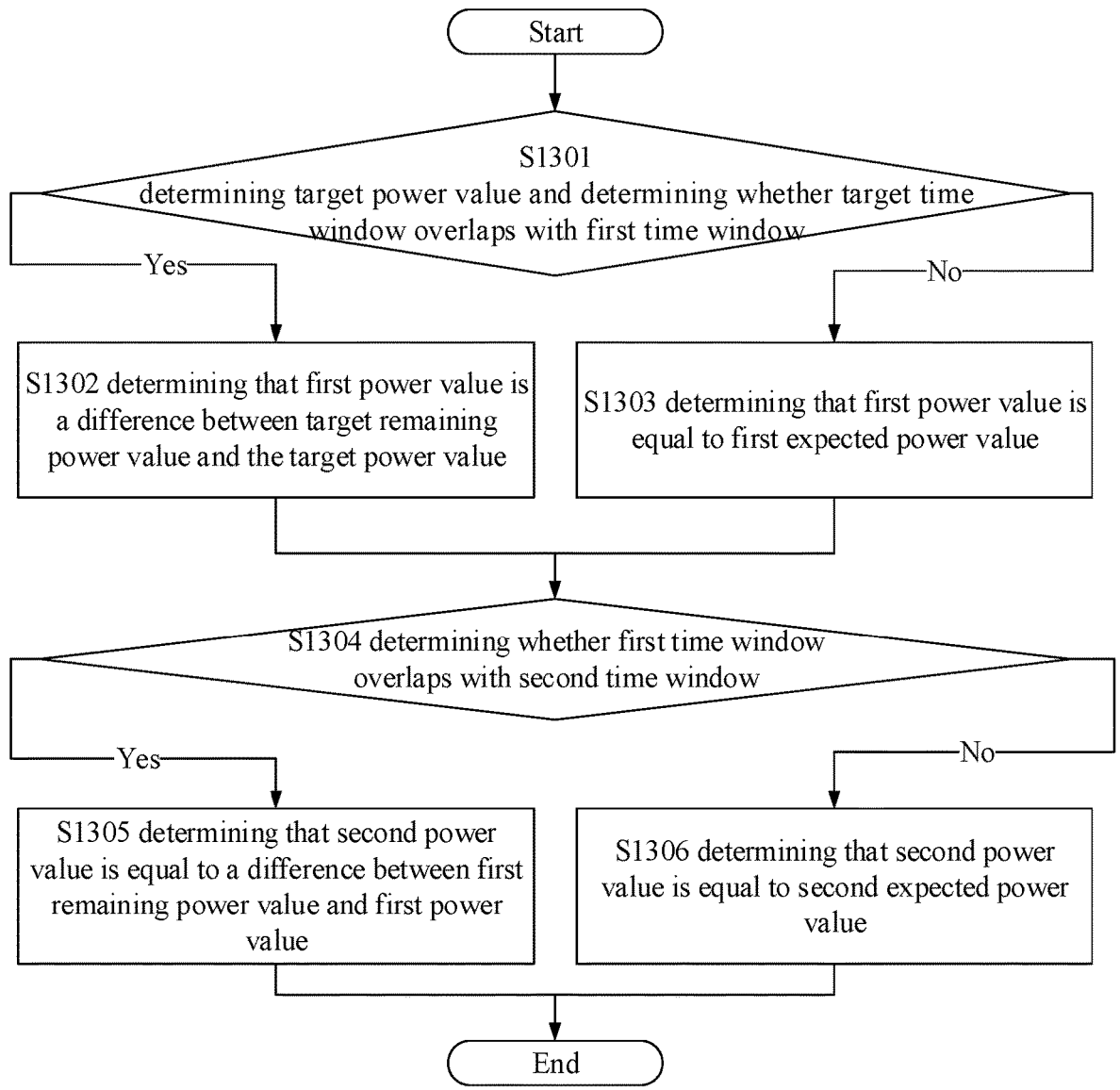
FIG. 13 illustrates a flowchart of power allocation according to one embodiment of the present disclosure.

Embodiment 13 illustrates a flowchart of power allocation, as shown in FIG. 13. The first node operates as follows:

determining a target power value and whether a target time window overlaps with a first time window in step S1301;

if yes, determining that a first power value is equal to a difference between a target remaining power value and the target power value in step S1302;

if no, determining that a first power value is equal to first expected power value in step S1303;

determining whether a first time window is overlapped with a second time window in step S1304;

if yes, determining in step S1305 that a second power value is equal to a difference between a first remaining power value and a first power value;

if no, determining in step S1306 that a second power value is equal to a second expected power value.

In one embodiment, the target remaining power value is a transmitting power value acquired from a maximum transmitting power value minus a total transmitting power value of all radio signals other than the target radio signal; and the priority of power allocation of each radio signal of all radio signals other than the target radio signal is greater than the target radio signal.

In one embodiment, the target remaining power value is a largest power value that can be allocated to the first node on a first carrier, the target radio signal is transmitted on the first carrier.

In one subembodiment, the first carrier is a Component Carrier (CC).

In one subembodiment, the first carrier is a Bandwidth Part (BWP).

In one embodiment, a pathloss between the first node and the fourth node is used to determine the target power value.

In one embodiment, the target power value is unrelated to a pathloss between the first node and the second node.

In one embodiment, the target power value is unrelated to a pathloss between the first node and the third node.

In one embodiment, a pathloss between the first node and the second node is used to determine the first expected power value.

In one embodiment, a pathloss between the first node and the fourth node is used to determine the first expected power value.

In one embodiment, a pathloss between the first node and the third node is used to determine the second expected power value.

In one embodiment, a pathloss between the first node and the fourth node is used to determine the second expected power value.

In one embodiment, the first remaining power value is a transmitting power value acquired from a maximum transmitting power value minus a total transmitting power value of all radio signals other than the first control information and the second control information; and the priority of power allocation of any radio signal of all radio signals other than the first control information and the second control information is higher than the first control information and the second control information.

In one embodiment, the first remaining power value is a largest power value that can be used for sidelink transmission, which is left over after the first node's full allocation of transmitting power of an Uu link.

In one embodiment, a sum of the target power value and the first expected power value is greater than the target remaining power value.

In one embodiment, a sum of the first expected power value and the second expected power value is greater than the first remaining power value.

Embodiment 14

Figure 14:
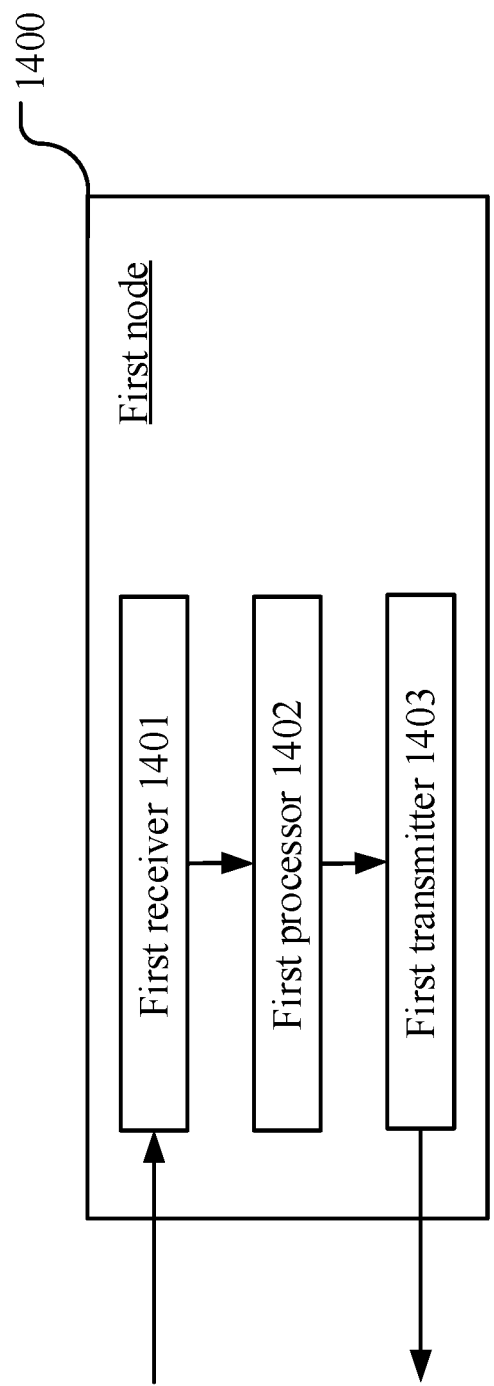
FIG. 14 illustrates a structure block diagram of a first node according to one embodiment of the present disclosure.

Embodiment 14 illustrates a structure block diagram of a first node, as shown in FIG. 14. In FIG. 14, a first node 1400 is comprised of a first receiver 1401, a first processor 1402 and a first transmitter 1403.

The first receiver 1401 receives a first radio signal and a second radio signal;

The first processor 1402 determines a transmitting power of first control information in a first time window as a first power value and a transmitting power of second control information in a second time window as a second power value;

The first processor 1403 transmits first control information with the first power value in the first time window.

In Embodiment 14, the first control information is associated with the first radio signal, and the second control information is associated with the second radio signal; the first radio signal is unicast, while the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

In one embodiment, the first transmitter 1403 transmits the second control information with the second power value in the second time window; when the first time window overlaps with the second time window, a difference between a first remaining power value and the first power value is used to determine the second power value; when the first time window does not overlap with the second time window, the second power value is unrelated to the first power value.

In one embodiment, when the first time window overlaps with the second time window, the first transmitter 1403 drops transmitting second control information in the second time window, the second power value is 0; when the first time window does not overlap with the second time window, the first transmitter 1403 transmits second control information with the second power value in the second time window, the second power value is unrelated to the first power value.

In one embodiment, the first transmitter 1403 transmits a target radio signal with a target power value in a target time window; the first radio signal and the second radio signal are transmitted in sidelink, while the target radio signal is transmitted on uplink; the first power value is relevant to whether the first time window overlaps with the target time window, the target power value is unrelated to the first power value.

In one embodiment, the first receiver 1401 receives a third radio signal, the third radio signal is used to determine a first expected power value, the first power value is equal to the first expected power value.

In one embodiment, the first receiver 1401 receives a fourth radio signal, the fourth radio signal is used to determine a second expected power value, the second power value is equal to the second expected power value.

In one embodiment, the first receiver 1401 receives a first signaling, the first signaling comprises configuration information of the first radio signal, the configuration information comprises at least one of time domain resources occupied, frequency domain resources occupied, an MCS or an RV.

In one embodiment, the first receiver 1401 receives a second signaling, the second signaling comprises configuration information of the second radio signal, the configuration information comprises at least one of time domain resources occupied, frequency domain resources occupied, an MCS or an RV.

In one embodiment, the first receiver 1401 comprises at least the first four of the antenna 452, the receiver 454, the multi-antenna receiving processor 458, the receiving processor 456 and the controller/processor 459 in Embodiment 4.

In one embodiment, the first processor 1402 comprises at least one of the multi-antenna transmitting processor 457, the transmitting processor 468 or the controller/processor 459 in Embodiment 4.

In one embodiment, the first transmitter 1403 comprises at least the first four of the antenna 452, the transmitter 454, the multi-antenna transmitting processor 457, the transmitting processor 468 and the controller/processor 459 in Embodiment 4.

Embodiment 15

Figure 15:
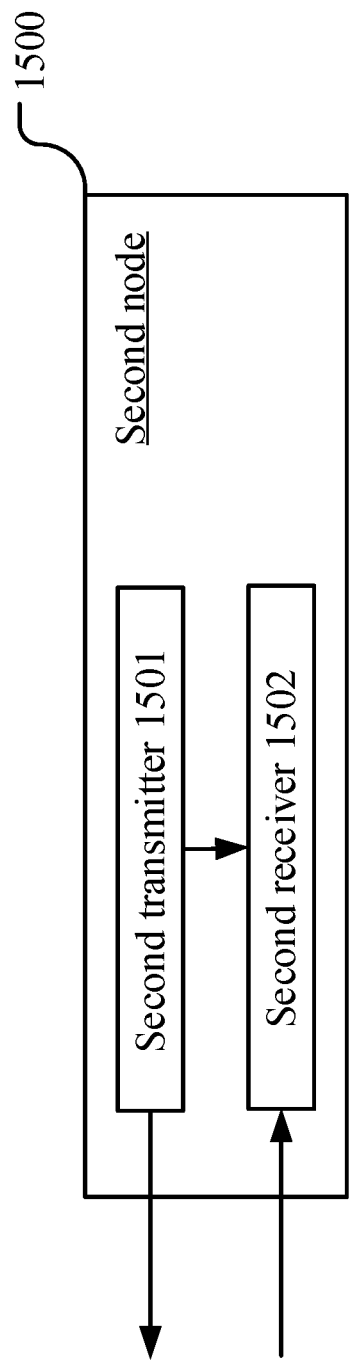
FIG. 15 illustrates a structure block diagram of a second node according to one embodiment of the present disclosure.

Embodiment 15 illustrates a structure block diagram of a second node, as shown in FIG. 15. In FIG. 15, a second node 1500 comprises a second transmitter 1501 and a second receiver 1502.

The second transmitter 1501 transmits a first radio signal;

The second receiver 1502 receives first control information in a first time window.

In Embodiment 15, the first control information is associated with the first radio signal, the first radio signal is unicast; a transmitting power of the first control information in the first time window is a first power value; a transmitter of the first control information determines a transmitting power of second control information in a second time window as a second power value, the second control information is associated with the second radio signal, and the second radio signal is groupcast; the first power value is unrelated to the second power value, the second power value is relevant to whether the first time window overlaps with the second time window; a physical layer channel format occupied by the first control information is the same as a physical layer channel format occupied by the second control information.

In one embodiment, the second transmitter 1501 transmits a third radio signal, the third radio signal is used to determine a first expected power value, the first power value is equal to the first expected power value.

In one embodiment, the second transmitter 1501 transmits a first signaling, the first signaling comprises configuration information of the first radio signal, the configuration information comprises at least one of time domain resources occupied, frequency domain resources occupied, an MCS or an RV.

In one embodiment, the second transmitter 1501 comprises at least the first four of the antenna 420, the transmitter 418, the multi-antenna transmitting processor 471, the transmitting processor 416 and the controller/processor 475 in Embodiment 4.

In one embodiment, the second receiver 1502 comprises at least the first four of the antenna 420, the receiver 418, the multi-antenna receiving processor 472, the receiving processor 470 and the controller/processor 475 in Embodiment 4.

Embodiment 16

Figure 16:
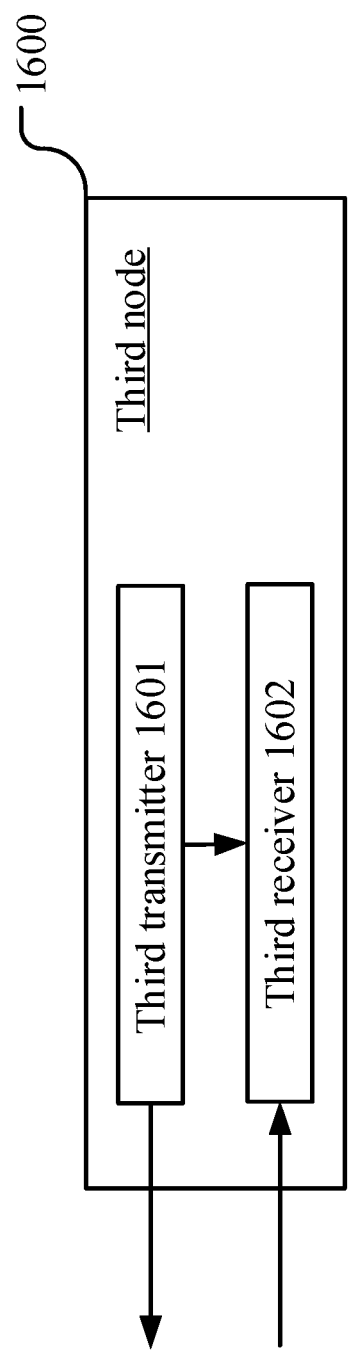
FIG. 16 illustrates a structure block diagram of a third node according to one embodiment of the present disclosure.

Embodiment 16 illustrates a structure block diagram of a third node, as shown in FIG. 16. In FIG. 16, a third node 1600 comprises a third transmitter 1601 and a third receiver 1602.

The third transmitter 1601 transmits a second radio signal;
The third receiver 1602 receives second control information in a second time window.

In Embodiment 16, the second control information is associated with the second radio signal, the second radio signal is groupcast; a transmitting power of the second control information in the second time window is a second power value; a transmitter of the second control information determines a transmitting power of first control information in a first time window as a first power value, the first control information is associated with the first radio signal, and the first radio signal is unicast; the first power value is unrelated to the second power value, the second power value is relevant to whether the first time window overlaps with the second time window; a physical layer channel format occupied by the first control information is the same as a physical layer channel format occupied by the second control information.

In one embodiment, the third transmitter 1601 transmits a fourth radio signal, the fourth radio signal is used to determine a second expected power value, the second power value is less than the second expected power value.

In one embodiment, the third transmitter 1601 transmits a second signaling, the second signaling comprises configuration information of the second radio signal, the configuration information comprises at least one of time domain resources occupied, frequency domain resources occupied, an MCS or an RV.

In one embodiment, the third transmitter 1601 comprises at least the first four of the antenna 420, the transmitter 418, the multi-antenna transmitting processor 471, the transmitting processor 416 and the controller/processor 475 in Embodiment 4.

In one embodiment, the third receiver 162 comprises at least the first four of the antenna 420, the receiver 418, the multi-antenna receiving processor 472, the receiving processor 470 and the controller/processor 475 in Embodiment 4.

Embodiment 17

Figure 17:
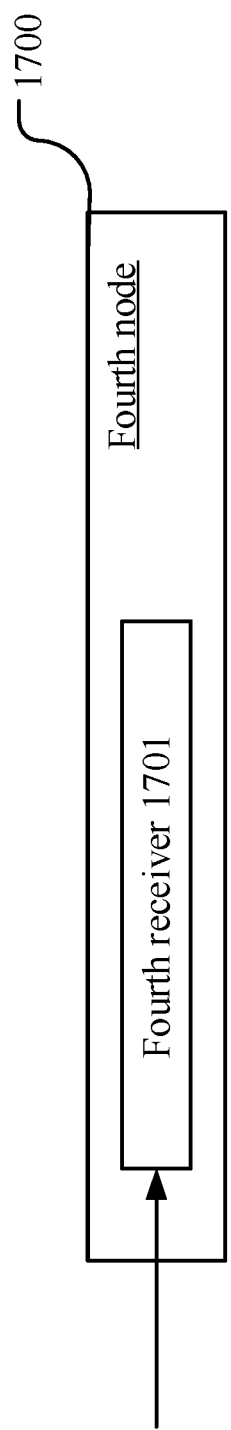
FIG. 17 illustrates a structure block diagram of a fourth node according to one embodiment of the present disclosure.

Embodiment 17 illustrates a structure block diagram of a fourth node, as shown in FIG. 17. In FIG. 17, a fourth node 1700 comprises a fourth receiver 1701.

The fourth receiver 1701 receives a target radio signal in a target time window.

In Embodiment 17, a first radio signal and a second radio signal are transmitted in sidelink, while the target radio signal is transmitted on uplink; first control information is associated with the first radio signal, and second control information is associated with the second radio signal; the first radio signal is unicast, while the second radio signal is groupcast; both a transmitter of the first radio signal and a transmitter of the second radio signal are non-co-located with the fourth node; a transmitting power of the first control information in a first time window is a first power value, and a transmitting power of the second control information in a second time window is a second power value; the first power value is unrelated to the second power value, the second power value is relevant to whether the first time window overlaps with the second time window; a physical layer channel format occupied by the first control information is the same as a physical layer channel format occupied by the second control information; the first power value is relevant to whether the first time window overlaps with the target time window, the target power value is unrelated to the first power value.

In one embodiment, the fourth receiver 1701 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and second node in the present disclosure include but are not limited to mobile phones, tablet computers, notebooks, network cards, low-consumption equipment, enhanced MTC (eMTC) equipment, NB-IOT terminals, vehicle-mounted equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellites, airborne base station, RSU and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node used for wireless communications, comprising: a first receiver, receiving a first radio signal and a second radio signal; a first processor, determining a transmitting power of first control information in a first time window as a first power value and a transmitting power of second control information in a second time window as a second power value; and a first transmitter, transmitting first control information with the first power value in the first time window; wherein the first control information is associated with the first radio signal, and the second control information is associated with the second radio signal; the first radio signal is unicast, while the second radio signal is groupcast; the first power value is unrelated to the second power value, the second power value is relevant to whether the first time window overlaps with the second time window; a physical layer channel format occupied by the first control information is the same as a physical layer channel format occupied by the second control information; when the first time window overlaps with the second time window, the first transmitter drops transmitting the second control information in the second time window, the second power value is 0, when the first time window does not overlap with the second time window, the first transmitter transmits the second control information with the second power value in the second time window, the second power value is not used to determine the first power value; the physical layer channel format occupied by the first control information and the physical layer channel format occupied by the second control information are both Physical Sidelink Feedback Channels; the first control information comprises a HARQ-ACK of the first radio signal and the second control information comprises a HARQ-ACK of the second radio signal.

2. The first node according to claim 1, wherein the first transmitter transmits the second control information with the second power value in the second time window; when the first time window overlaps with the second time window, a difference between a first remaining power value and the first power value is used to determine the second power value; when the first time window does not overlap with the second time window, the second power value is unrelated to the first power value.

3. The first node according to claim 1, wherein the first transmitter transmits a target radio signal with a target power value in a target time window; the first radio signal and the second radio signal are transmitted in sidelink, while the target radio signal is transmitted in uplink; the first power value is relevant to whether the first time window overlaps with the target time window, the target power value is unrelated to the first power value.

4. The first node according to claim 1, wherein the first control information is used to determine whether the first radio signal is correctly decoded, the second control information is used to determine whether the second radio signal is correctly decoded.

5. A second node used for wireless communications, comprising: a second transmitter, transmitting a first radio signal; and a second receiver, receiving first control information in a first time window; wherein the first control information is associated with the first radio signal, the first radio signal is unicast; a transmitting power of the first control information in the first time window is a first power value; a transmitter of the first control information determines a transmitting power of second control information in a second time window as a second power value, the second control information is associated with a second radio signal, the second radio signal is groupcast; the first power value is unrelated to the second power value, the second power value is relevant to whether the first time window overlaps with the second time window; a physical layer channel format occupied by the first control information is the same as a physical layer channel format occupied by the second control information when the first time window overlaps with the second time window, a transmitter of the first control information drops transmitting the second control information in the second time window, the second power value is 0; when the first time window does not overlap with the second time window, a transmitter of the first control information transmits the second control information with the second power value in the second time window, the second power value is not used to determine the first power value; the physical layer channel format occupied by the first control information and the physical layer channel format occupied by the second control information are both Physical Sidelink Feedback Channels; the first control information comprises a HARQ-ACK of the first radio signal and the second control information comprises a HARQ-ACK of the second radio signal.

6. The second node according to claim 5, wherein the first control information is used to determine whether the first radio signal is correctly decoded, the second control information is used to determine whether the second radio signal is correctly decoded.

7. A method in a first node used for wireless communications, comprising: receiving a first radio signal and a second radio signal; determining a transmitting power of first control information in a first time window as a first power value and a transmitting power of second control information in a second time window as a second power value; and transmitting first control information with the first power value in the first time window; when the first time window overlaps with the second time window, drops transmitting the second control information in the second time window, the second power value is 0; when the first time window does not overlap with the second time window, transmits the second control information with the second power value in the second time window, the second power value is not used to determine the first power value; wherein the first control information is associated with the first radio signal, and the second control information is associated with the second radio signal; the first radio signal is unicast, while the second radio signal is groupcast; the first power value is unrelated to the second power value, the second power value is relevant to whether the first time window overlaps with the second time window; a physical layer channel format occupied by the first control information is the same as a physical layer channel format occupied by the second control information, the physical layer channel format occupied by the first control information and the physical layer channel format occupied by the second control information are both Physical Sidelink Feedback Channels; the first control information comprises a HARQ-ACK of the first radio signal and the second control information comprises a HARQ-ACK of the second radio signal.

8. The method in the first node according to claim 7, comprising:
transmitting the second control information with the second power value in the second time window;
wherein when the first time window overlaps with the second time window, a difference between a first remaining power value and the first power value is used to determine the second power value; when the first time window does not overlap with the second time window, the second power value is unrelated to the first power value.

9. The method in the first node according to claim 7, comprising:
transmitting a target radio signal with a target power value in a target time window;
wherein the first radio signal and the second radio signal are transmitted in sidelink, while the target radio signal is transmitted in uplink; the first power value is relevant to whether the first time window overlaps with the target time window, the target power value is unrelated to the first power value.

10. The method in the first node according to claim 7, wherein the first control information is used to determine whether the first radio signal is correctly decoded, the second control information is used to determine whether the second radio signal is correctly decoded.

11. A method in a second node used for wireless communications, comprising: transmitting a first radio signal; and receiving first control information in a first time window; wherein the first control information is associated with the first radio signal, the first radio signal is unicast; a transmitting power of the first control information in the first time window is a first power value; a transmitter of the first control information determines a transmitting power of second control information in a second time window as a second power value, the second control information is associated with the second radio signal, and the second radio signal is groupcast; the first power value is unrelated to the second power value, the second power value is relevant to whether the first time window overlaps with the second time window; a physical layer channel format occupied by the first control information is the same as a physical layer channel format occupied by the second control information when the first time window overlaps with the second time window, a transmitter of the first control information drops transmitting the second control information in the second time window, the second power value is 0; when the first time window does not overlap with the second time window, a transmitter of the first control information transmits the second control information with the second power value in the second time window, the second power value is not used to determine the first power value, the physical layer channel format occupied by the first control information and the physical layer channel format occupied by the second control information are both Physical Sidelink Feedback Channels; the first control information comprises a HARQ-ACK of the first radio signal and the second control information comprises a HARO-ACK of the second radio signal.

12. The method in the second node according to claim 11, wherein the first control information is used to determine whether the first radio signal is correctly decoded, the second control information is used to determine whether the second radio signal is correctly decoded.

* * * * *